United States Patent
Maheriya et al.

(10) Patent No.: US 10,528,815 B2
(45) Date of Patent: Jan. 7, 2020

(54) METHOD AND DEVICE FOR VISUALLY IMPAIRED ASSISTANCE

(71) Applicant: VasuYantra Corp., Milpitas, CA (US)

(72) Inventors: Kiran K. Maheriya, Milpitas, CA (US); Shiva V. Srivastava, Sunnyvale, CA (US)

( * ) Notice: Subject to any disclaimer, the term of this patent is extended or adjusted under 35 U.S.C. 154(b) by 129 days.

(21) Appl. No.: 15/728,379

(22) Filed: Oct. 9, 2017

(65) Prior Publication Data

US 2018/0189567 A1    Jul. 5, 2018

Related U.S. Application Data

(63) Continuation-in-part of application No. 15/411,837, filed on Jan. 20, 2017, now Pat. No. 9,792,501.

(60) Provisional application No. 62/441,284, filed on Dec. 31, 2016.

(51) Int. Cl.
| | |
|---|---|
| G06K 9/00 | (2006.01) |
| G09B 21/00 | (2006.01) |
| G06T 7/593 | (2017.01) |
| G06T 7/536 | (2017.01) |
| G06K 9/62 | (2006.01) |
| G06K 9/46 | (2006.01) |

(52) U.S. Cl.
CPC ..... *G06K 9/00671* (2013.01); *G06K 9/00214* (2013.01); *G06K 9/4628* (2013.01); *G06K 9/6267* (2013.01); *G06K 9/6273* (2013.01); *G06T 7/536* (2017.01); *G06T 7/593* (2017.01); *G09B 21/003* (2013.01); *G09B 21/006* (2013.01); *G09B 21/007* (2013.01); *G09B 21/008* (2013.01); *G06T 2207/10021* (2013.01); *G06T 2207/20084* (2013.01)

(58) Field of Classification Search
None
See application file for complete search history.

(56) References Cited

U.S. PATENT DOCUMENTS

| | | | |
|---|---|---|---|
| 8,244,069 B1 * | 8/2012 | Bourdev | G06K 9/033 382/291 |
| 2004/0095388 A1 * | 5/2004 | Rocchetti | G06F 8/38 715/763 |
| 2008/0123937 A1 * | 5/2008 | Arias Estrada | G06T 7/85 382/154 |

(Continued)

*Primary Examiner* — Jiangeng Sun
(74) *Attorney, Agent, or Firm* — Stephen E. Zweig

(57) ABSTRACT

A device, system, and method of assistance for visually impaired users. The system comprises a plurality of video cameras, often head mounted, computer processors and associated support devices and algorithms configured for computer vision, and a user worn haptic band comprising a plurality (two or more) of distantly spaced haptic transducers. This haptic band is worn such that user's hands are free for other tasks. The system uses its video camera, depth processing algorithms, and object recognition algorithms (hardware and/or software based) to identify a limited number of navigationally important objects. The spatial locations of each object deemed important is output to the user by varying output to the haptic transducers accordingly. The system is configured to identify and report objects as generic objects, identified objects, and potential obstacle objects. The system can also optionally provide audio information or tactile graphics display information pertaining to these objects as well.

14 Claims, 27 Drawing Sheets

(56) References Cited

U.S. PATENT DOCUMENTS

| | | | |
|---|---|---|---|
| 2013/0141542 A1* | 6/2013 | Tsuchiya | G06T 3/00 348/46 |
| 2016/0123745 A1* | 5/2016 | Cotier | G06F 16/9537 701/467 |
| 2016/0180879 A1* | 6/2016 | Ullrich | G06F 3/016 386/201 |
| 2016/0209648 A1* | 7/2016 | Haddick | G02B 27/0093 |
| 2016/0224116 A1* | 8/2016 | Hagedorn | G09B 21/003 |
| 2016/0379074 A1* | 12/2016 | Nielsen | G06K 9/3241 348/143 |
| 2018/0330198 A1* | 11/2018 | Harary | G06K 9/4604 |

* cited by examiner

Figure 6A
Figure 6B
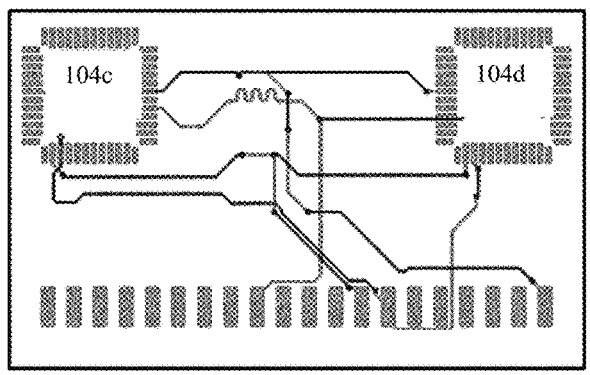
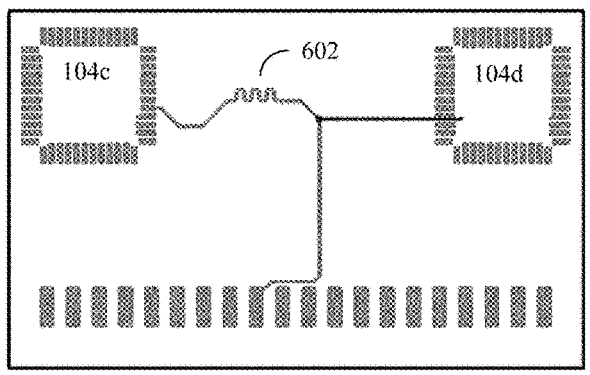

Figure 9A
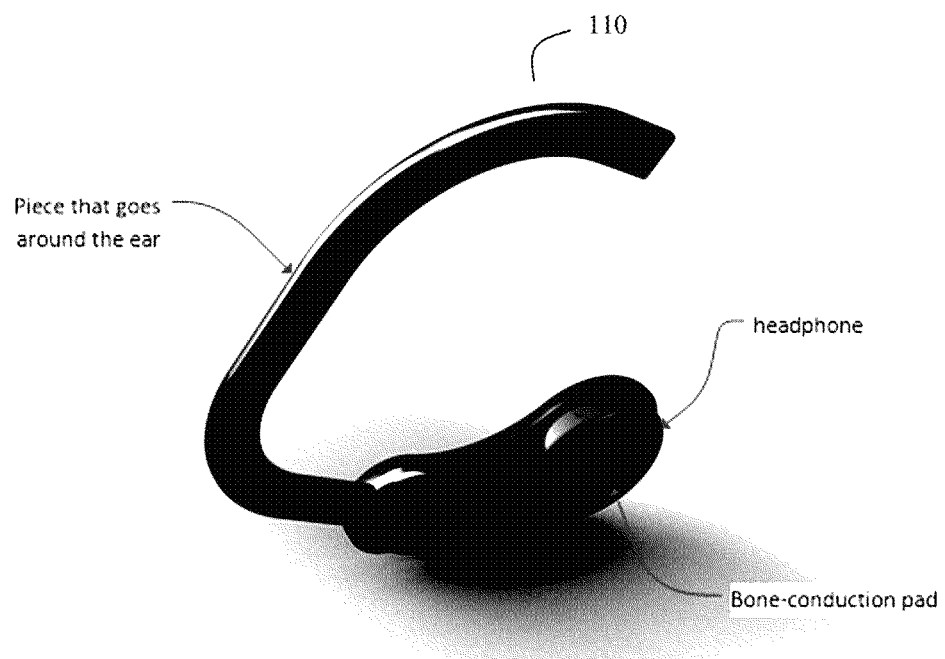
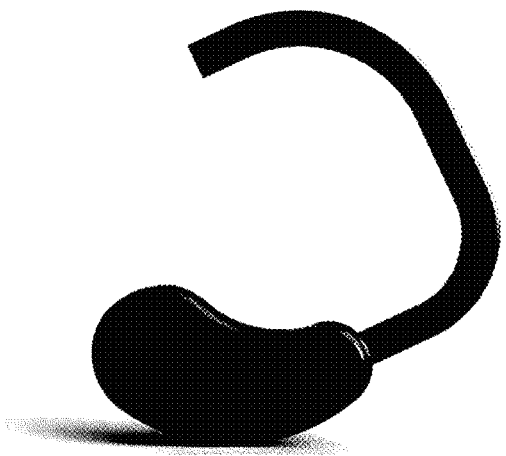
Figure 9B
Figure 9C

Figure 11A
Figure 11B
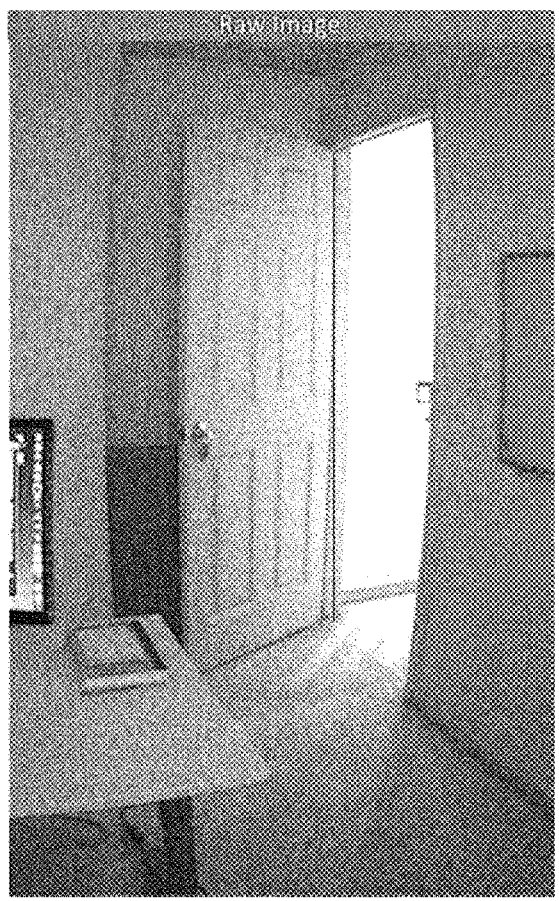
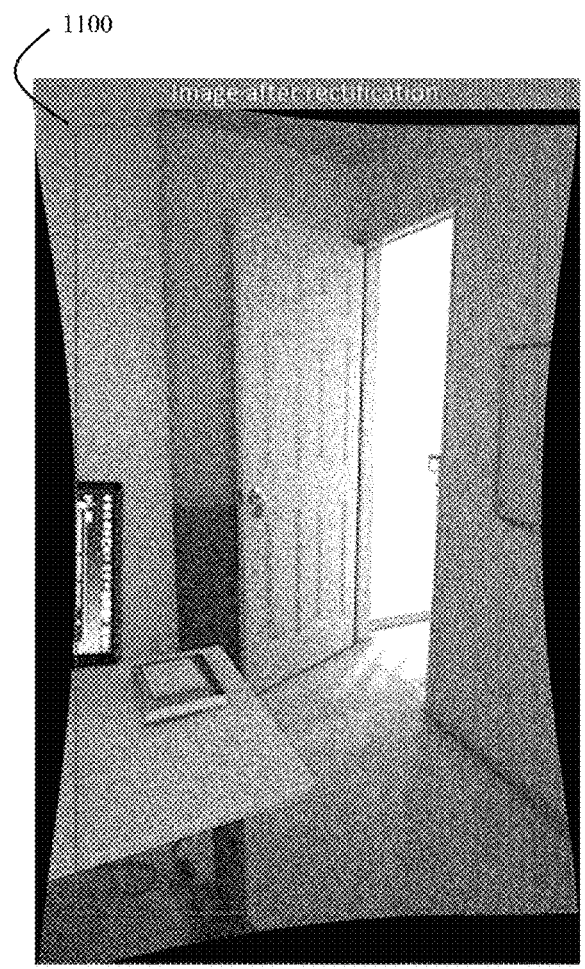

Figure 13A
Figure 13B
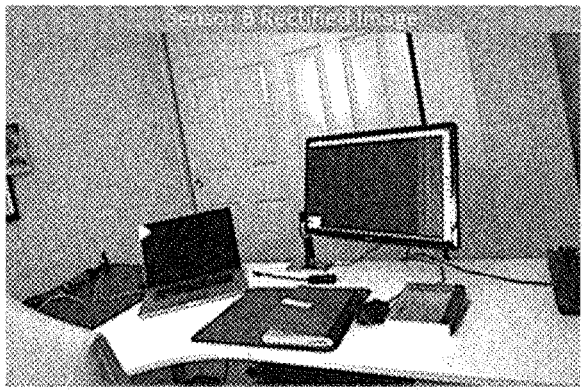
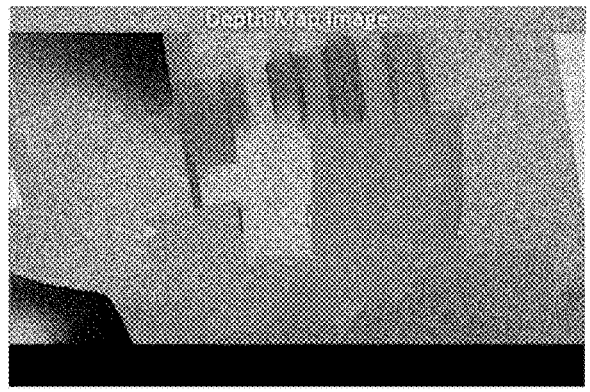
Figure 13C

Figure 20A
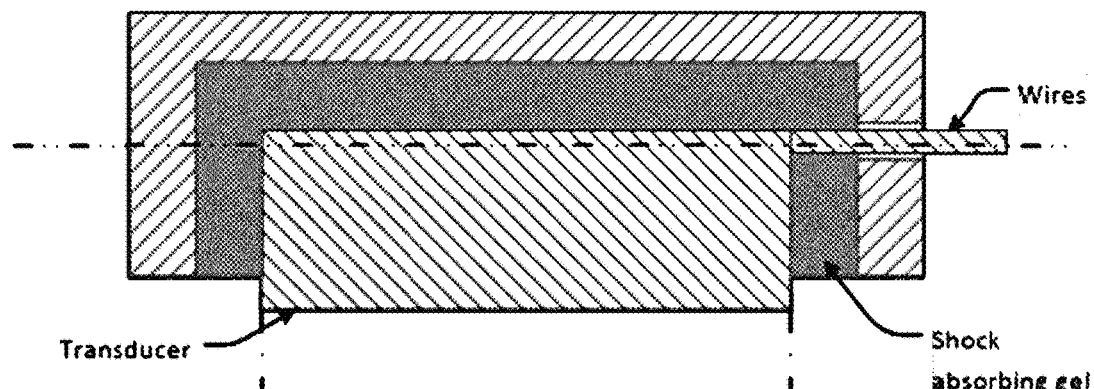
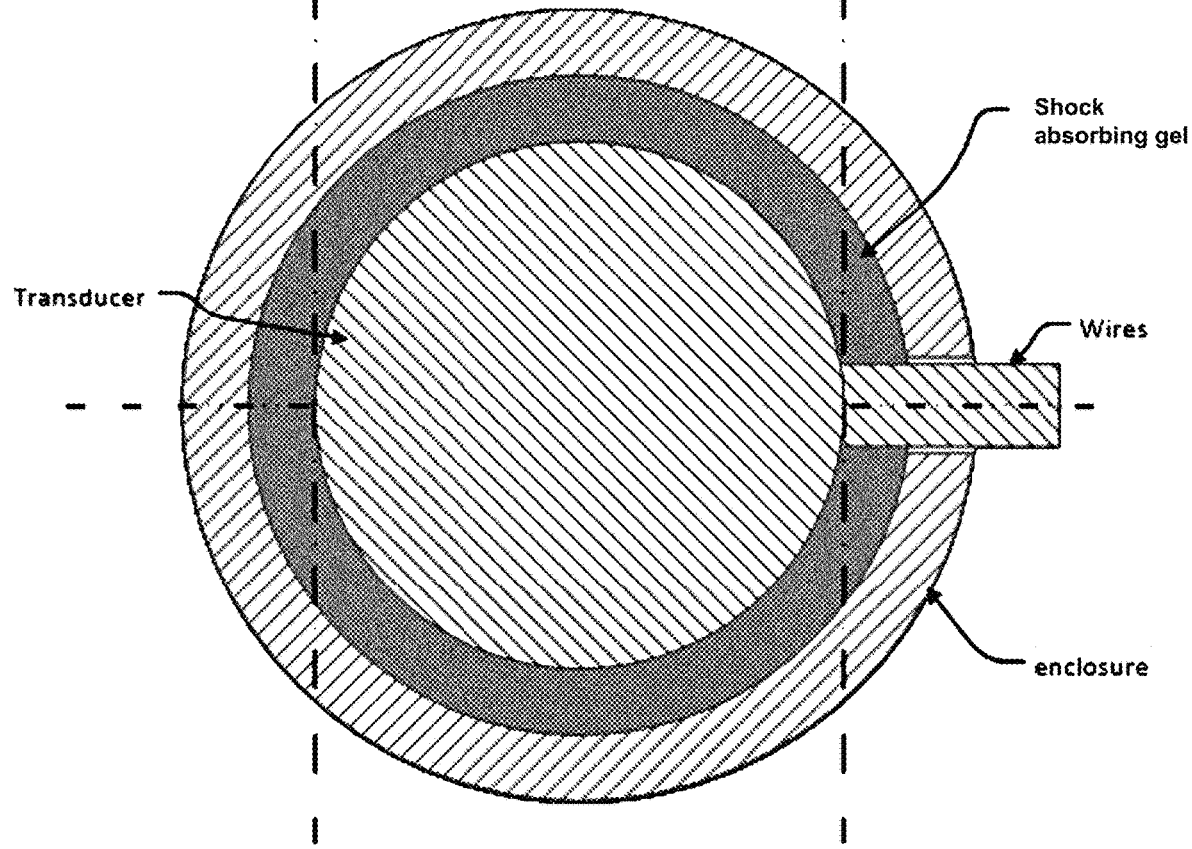
Figure 20B

METHOD AND DEVICE FOR VISUALLY IMPAIRED ASSISTANCE

CROSS REFERENCE TO RELATED APPLICATIONS

This application is a continuation in part of U.S. patent application Ser. No. 15/411,837, "METHOD AND DEVICE FOR VISUALLY IMPAIRED ASSISTANCE", filed Jan. 20, 2017, now U.S. Pat. No. 9,792,501 issued Oct. 17, 2017; Application Ser. No. 15/411,837 claimed the priority benefit of U.S. provisional application 62/441,284 "Device for Visually Impaired Assistance", filed Dec. 31, 2016, the entire contents of both applications are incorporated herein by reference.

BACKGROUND OF THE INVENTION

Field of the Invention

This invention is in the field of computerized visual assist devices for the visually impaired.

Description of the Related Art

According to a WHO 2010 global survey, the number of people who are visually impaired is "estimated to be 285 million, of whom 39 million are blind". Per the 2000 US census, 3.4 million Americans had blindness or low vision, and this number is estimated to increase by about 70% by the year 2020. Even accounting only for adults age 40 and above, there are about 1.3 million blind people, and this number is projected to grow to 2.1 million by 2030.

However, many other people experience functional limitations due to vision loss, even though they do not meet the criteria for legal blindness. Even relatively mild vision impairment can affect the performance of everyday tasks such as driving, reading, and walking. When more broadly defined as visual problems that hamper the performance and enjoyment of everyday activities, other recent estimates indicate that almost 14 million Americans are visually impaired.

If visually impaired people could carry out their day-to-day activities like the people with normal vision, their chance of having a better quality of life will also improve.

Walking with confidence is a prime need for visually impaired (VI) people. This not only lets them make sense of the environment, it builds their confidence and allows greater independence. In this regard, various electronic methods, involving electronic haptic transducers and/or machine vision methods have been proposed. These include the methods of Gassert US 2013/0220392, Stetten US 2008/0226134, Zeleck US 2013/0218456, and Zhu US 2016/0321955.

Computer vision methods: There has been a substantial improvement in computer vision algorithms in the past decade. The advent of machine learning techniques—specialized algorithms as part of artificial intelligence—has both made the computer vision more accurate, and it has also increased the ability of computer vision methods to recognize more objects in the environment in real time. Some of these recent advances in computer vision methods are exemplified by W. Liu, D. Anguelov, D. Erhan, C. Szegedy and S. Reed, "*SSD: Single Shot MultiBox Detector*" arXiv preprint arXiv:1512.02325, 2015, and J. Redmon, S. Divvala, R. Girshick and A. Farhadi, "*You Only Look Once: Unified, real-time object detection*" arXiv preprint arXiv:1506.02640, 2015.

Other computer vision methods include convolutional neural networks (ConvNets), which have outperformed classic computer vision algorithms in terms of speed as well as performance. Such methods are exemplified by A. Krizhevsky, I. Sutskever and G. E. Hinton, "*ImageNet Classification with Deep Convolutional Neural Networks,*" *Advances in neural information processing systems*, 2012; and others.

Tactile graphics displays (TGD) capable of outputting Braille, or more complex bit-mapped graphics including tactile display of images, are known in the art. These include the art of Gouzman, U.S. Pat. No. 6,762,749; Gupta, U.S. Pat. No. 6,459,364; Roberts, U.S. Pat. No. 7,009,595 and others. Such TGD include the Graphiti 40×60 tactile graphics display, produced by Orbit Research, Wilmington Del., and others.

BRIEF SUMMARY OF THE INVENTION

The invention is based, in part on the insight that it would be desirable to produce new types of devices and methods to assist people with low vision or blindness. Throughout this disclosure, these new types of devices and methods are occasionally referred to in the alternative as "DVIA" (Device for Visually Impaired Assistance) devices, systems, and methods. The overall concept is to produce a user worn computer vision device that creates a sensory perception of the environment around the wearer in the form of haptic feedback, and optional auditory feedback.

In broad overview, the invention operates by using wearable video sensors, computer processors, and various machine vision techniques to parse and analyze the environment or scene around the wearer. The device attempts to detect important objects, often navigationally important objects, and uses haptic transducers to report these objects. This allows the wearer to make more informed decisions while walking indoors or outdoors.

The invention is based, in part, on the insight that when people with normal vision look at the world around them, they get several cues to help them walk around. The following are two important cues for mobility:

Perception of depth and spatial location: The eyes look at the scene from two different angles, and the brain processes that information to get a perception of depth. People with normal vision perceive how far and where the objects are just by looking at them.

Object recognition and presence: This is another important cue for mobility. When people with normal vision see a doors or stairs, they can both identify door and stair objects. Conversely, if they see an obstructing object in their path, they can also identify this obstructing object.

Since partially sighted or blind people have limited or no perception of depth, this lack of depth perception creates a substantial impediment in their ability to walk with confidence. Similarly, the ability to perceive and recognize objects is also limited or not present in partially sighted or blind people.

Tactile feedback can replace or augment vision. Touch is the most common mode of tactile feedback. By touching objects and moving the fingers around the objects, a visually impaired person can get a three-dimensional (3D) sense of the objects' shape and texture. However, outside of canes for the blind, such tactile feedback is generally not regarded as a practical option while walking. This is because such canes can only work at best a few feet in front of the user.

The invention is based, in part, on the insight that modern computer vision methods, combined with improved haptic transducer systems, and more sophisticated computer controlled haptic feedback (e.g. vibrotactile feedback) methods, can produce new types of DVIA devices that can help bridge the gap between touch and vision.

BRIEF DESCRIPTION OF THE DRAWINGS

FIGS. 6A and 6B show an example of trace mapping, here using partially traced printed circuit boards.

FIGS. 9A, 9B, and 9C show various close-up views of an optional audio attachment, here configured with a headphone adapted for placement over the user's left ear.

FIGS. 11A and 11B show an example image from the vision band's video sensors, here shown before and after an optional image rectification process.

FIGS. 13A, 13B, and 13C show an example of stereo images that may be obtained from two of the head band's video sensors, and a corresponding depth map that the device's processor may produce from this data.

FIGS. 20A and 20B show an example of an individual haptic transducer, here configured in an enclosure with a shock absorbing gel.

DETAILED DESCRIPTION OF THE INVENTION

In broad terms, the invention may be viewed as a method, system, or device for visual assistance for a human user in an environment.

Figure 3:
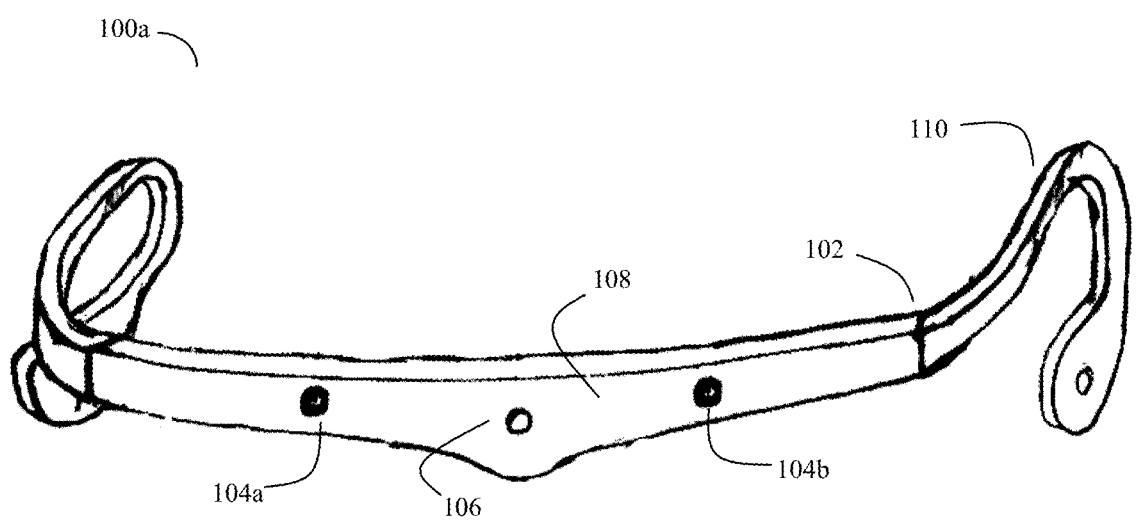
FIG. 3 shows a head-worn video sensor band (vision band) with optional audio attachment.

The invention typically comprises a head mounted video sensor band with at least two video sensors, here often referred to as "a plurality of user worn video sensors". These video sensors are preferably worn about eye or forehead level, and in some embodiments may be configured to either look like standard eyeglasses, or may be configured to look like a specialized device as shown in FIG. 3.

The invention also typically comprises a haptic transducer band (see FIG. 18) equipped with at least two computer-controlled haptic transducers, here often called a plurality of spatially separated user worn haptic transducers. To keep the user's hand and fingers free for everyday use, these user-worn haptic transducers will typically be configured to be worn on parts of the body other than the user's hands, such as the user's arm (e.g. above the wrist but below the shoulder), the user's leg, or around the user's torso. Because the ability for users to sense touch sensations in these areas of the body is often quite less acute than it is in the user's hands and fingers, the various haptic transducers should typically be placed far enough away from each other, often 1, 2, 3, 4 centimeters or more, so that the user can easily distinguish between haptic sensations from one haptic transducer, over haptic sensations from another haptic transducer.

The invention also comprises at least one computer processor configured to perform various types of computer vision processing on data obtained from the various video sensors, and configured to send haptic output signals to the various haptic transducers on the haptic transducer band.

Although, in some embodiments, this computer vision processor can be located in either the vison band or haptic transducer band, in some embodiments, at least some computer vision algorithms and processors may reside in a separate user worn device, called the "hub".

These separate units are all in communication with each other to form a complete DVIA system. That is, the vision band with its plurality of video sensors, the haptic transducer band with its plurality of spatially separated user worn haptic transducers, and the hub will all be in either wired or wireless (e.g. Bluetooth) communication with each other. Thus the DVIA system and device comprises, at a minimum, the vision band and the haptic transducer band (haptic band), with an optional hub unit (as needed) that can hold additional processing capability required for the system's extensive computer vision processors. As processor power and size needs decrease, in some embodiments, the computer vision processing can be relocated to any of the vision band or haptic band, in which case a separate "hub" may not be required. However, unless otherwise specified, the "hub" here will generally be used to refer to the part of the system that handles the bulk of the computer vision processing requirements.

The invention typically uses this plurality of user worn video sensors (often at least two head worn sensors) to acquire 3D images of the user's environment.

Here, assume that the user's environment comprises a plurality of different objects. Indoors, these different objects can be furniture, doors, stairs, signs (e.g. "Exit" signs) and the like. Outdoors these different objects may be streets, curbs, buildings, vehicles, stairs, trees, posts street signs, warning signs, and the like. Some of these objects will be located near the user's present location, while other objects will be located further away from the user's present location. In other words, each different object will have a different 3D object location.

Relative to normal human eyes, which transmit a vast amount of data to an individual every second, a much smaller amount of data can be transmitted by touch. Thus, the invention must greatly compress a vast amount of video data regarding the user's surroundings, and attempt to deliver only the most important aspects to the user in a form that does not overly interfere with the user's other senses. That is, a person with vision impairment needs to generally have their hands free (unobstructed) for interacting with their environment, and also generally needs to use their ears to receive valuable and naturally occurring sounds from their environment. The invention's DVIA system is designed to attempt to minimize interference with the user's hands and ears whenever feasible.

Some objects are going to be more important than others, and the haptic transducers, even with optional DVIA audio output, will only be able to communicate a small amount of data to the user per second. Thus, a big part of the problem is to avoid flooding the user with too much irrelevant detail. The invention uses various computer vision methods, described below, to try to sort out the most important objects from the less important objects, and only present information on the most important objects to the user.

To do this the system is typically configured to perform various computer vision operations, such as performing at least one, and often two or more of the following steps:

a) Distance analyze, using at least one computer processor and computer vision distance algorithms, 3D images of the user's environment to identify both far objects and nearby objects with a 3D object location near the user.

The process of converting images from the plurality of video sensors to 3D images will be discussed shortly. Here the idea is that often objects near the user are more important, since they may be potential obstacles or navigation objectives. At the same time, at least some objects further away from the user may also be important, because they also may represent goals, information sources, or problems (e.g. doorways, moving vehicles, roads or sidewalks, signs with important information, and the like).

b) The DVIA system is also designed to object analyze, using its at least one computer processor and various computer vision image recognition algorithms (to be described shortly), any of the far objects and nearby objects against ID tagged reference objects. The processor will then assign corresponding ID tags and bounding boxes to both of those far objects and nearby objects which correspond to the ID tagged reference objects, thereby producing "identified tagged objects".

Here the idea is that the system will attempt to analyze both near and far objects against a library of potentially identifiable things—doorways, stairs, signs, etc., and whenever possible attempt to identify these objects.

c) The DVIA system is also configured to classify those nearby objects that do not correspond to the ID tagged reference objects, as "generic objects".

Here, even if the system can determine that something is an object, but can't identify what type of an object that thing is, if it is close to the user, this unidentified object could be important since it is an obstacle. So, it is better to give a generic warning of something (e.g. a "generic object") that is close to the user, even if that object can't be specifically identified. One such effect is to continuously provide haptic perception to the user of these nearby multiple objects so that the user can get a persistent sense of the environment around them, i.e., feel where such objects are located around them, and navigate around by making decisions similar to a normally sighted person would, albeit in a limited capacity.

Mapping: The DVIA system (device/method) will then use its at least one computer processor and the plurality of spatially separated user worn haptic transducers (e.g. the haptic transducer band) to map the 3D object locations of at least some of these identified tagged objects and generic objects onto haptic outputs of these haptic transducers.

Here the system's computer processor can be programmed with various algorithms to try to avoid overloading the user with too much information. In some embodiments, the system may be configured (e.g. trained) to avoid outputting some 3D object locations if a particular object is deemed to be nearby, but below a certain size limit. In some embodiments, the system may also be configured (e.g. trained) to avoid outputting some 3D object locations if the object is identified and determined to be trivial, such as the location of windows, pictures, mountains, clouds, and other background information. Thus, in some embodiments, as will be discussed further shortly, there can be an initial training process where the system is trained as to the various thresholds to use, what identified objects to report, and what to ignore.

Device Overview

Figure 1:
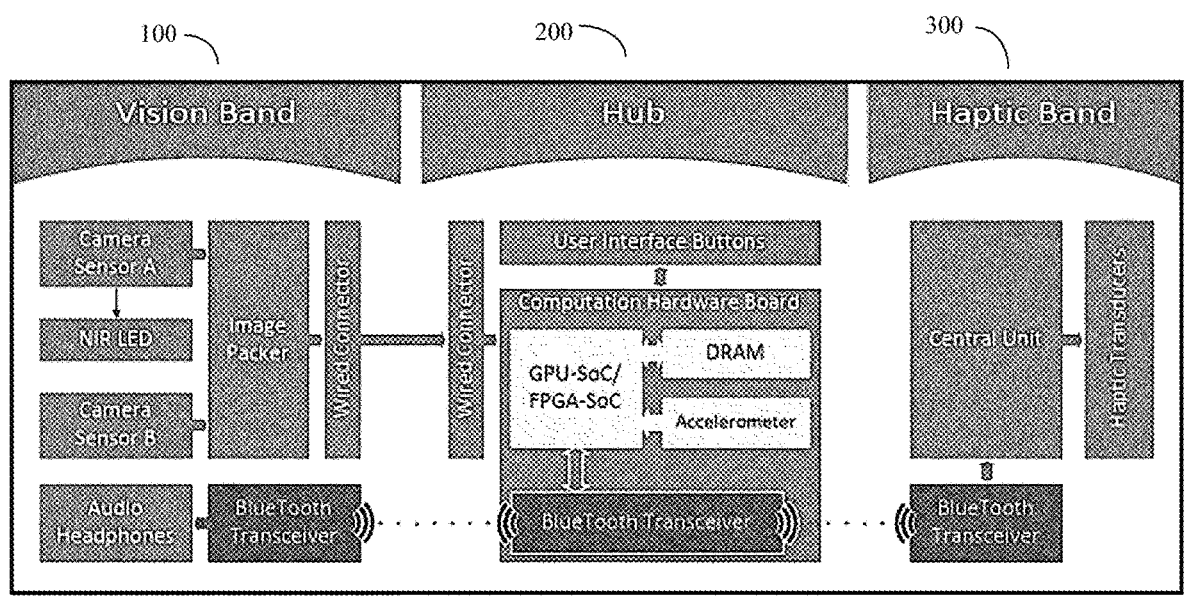
FIG. 1 shows a main block diagram of one embodiment of the invention's DVIA device.

As previously discussed, in some embodiments, the DVIA invention can be implemented by a system or device comprising at least two (and often three) main physical components, all in either wired or wireless data communication with each other. A high-level electrical block diagram of the DVIA system/device is shown in FIG. 1:

The invention will typically comprise a "vision band" (100) (e.g. a plurality of user worn video sensors), which may also have an optional audio attachment. In some embodiments, this can comprise at least two (A and B) camera sensors, optional near infrared (NIR) light emitting diodes (LED), optional audio headphones, an optional processor (image packer) to compress video to send to a distant component such as the hub (200), and a wired or wireless connection (such as a Bluetooth connection) to other components such as the hub.

The invention will also comprise processing circuitry to implement the invention's computer vision functionality. This image recognition functionality will typically be implemented by at least one computer processor. In this disclosure, in some embodiments this is represented and termed the system's central processing module or "Hub" (200). As previously discussed, however, this "hub" can be, but need not be, physically separate from the vision band (100) and the haptic band (300). The hub (200) can often comprise one or more optional user interface buttons, wired or wireless connectors to other components, and various hardware resources such as various processors, graphics processors, custom circuits (e.g. FPGA circuits), memory (e.g. DRAM), other optional sensors (such as accelerometers) and the like.

The invention will typically also comprise at least one "Haptic band" (300), that is, a plurality of spatially separated user worn haptic transducers, often worn as a unit (e.g. in a band or other configuration). This haptic band will typically also comprise either wired or wireless connections to the other system components. The various systems will normally be powered by batteries, often rechargeable batteries (not shown). These batteries may, according to the wiring connectivity between the various units, reside in any or all of the units, or even may reside separately from all units but be attached to at least one of the units via a power connector (not shown).

In some embodiments, the vision band can be configured to capture the scene in front of the user/wearer via a plurality of video sensors/camera sensors. Typically, at least two (e.g. a pair) of video sensors are required to obtain 3D (distance) information, and the examples herein, although not intended to be limiting, will often be based on two (e.g. a pair) of video camera sensors (often arranged as stereo camera sensors A and B).

This vision band can provide the combined and synchronized video output from sensors A+B to the computer vision processors, often located in the hub (200).

In some embodiments, the hub acts as a central processing module of the device, and vision input processing is the biggest part of the computation in it. For example, in some embodiments, the hub receives the synchronized A+B video from the vision band and for each frame of the video, reconstructs a pair of A and B images. These stereo images are then processed in the hub to provide a depth map image of the scene, as well as other object recognition and other operations to be described shortly.

In some embodiments, one of the input images (image A) can be sent to a computer vision processor/algorithm, such as a convolutional neural network (ConvNet), for object recognition. The hub (200) can further process the information from depth map and object recognition output to detect multiple nearby objects, and generate three-dimensional (3D) coordinates of these objects. The hub can then send this information to the haptic band (300) using various methods, such as a direct wired, optical connection, infrared transmission, or various wireless methods such as Bluetooth, WiFi, ZigBee and other wireless protocols.

In some embodiments, the computer vision and processing functionality herein exemplified by the hub embodiment can be implemented as a custom hardware board, which can contain the components shown in FIG. 1 (200) and as described later. However, in some embodiments, computational resources available in other devices, such as processor equipped smartphones (cell phones) can also be utilized as a source of locally available computer processors that can take on at least some of the burden of image recognition and other computer processor mediated functions described herein.

The haptic band (300) receives the 3D object location data from the hub at the selected frame rate (often around 15 frames per second) and processes this data to generate output for the haptic drivers (transducers). The goal is to create a perception of depth and spatial location of these multiple objects for the wearer. Essentially the wearer will be able to feel where some of most important (e.g. navigationally important) objects are located.

An optional audio component in the hub, vision band, or haptic band can, in some embodiments, be used to also generate audio sounds for at least some of the various detected objects. In some embodiments, these can be stereo or 3D audio sounds to create a similar perception of depth and spatial location through a pair of headphones. These audio outputs can be part of the vision band attachment, or they can be separate from the vision band. Alternatively or additionally, the optional audio component may be used to announce names of various special (identified) objects like stairs, doorframes, sign names, etc.

Perception of Depth and Spatial Location

In some embodiments of the invention, the previously discussed computer vision distance algorithms can comprise stereo image rectification and depth map computation algorithms.

For overall perception of the environment, both the perception of depth and perception of (at least) the spatial locations (e.g. approximate direction of these objects relative to where the user is facing) of certain objects is often necessary. Additional information can also be added along the vertical axis to complete the 3D perception of the locations of the various objects.

Figure 2:
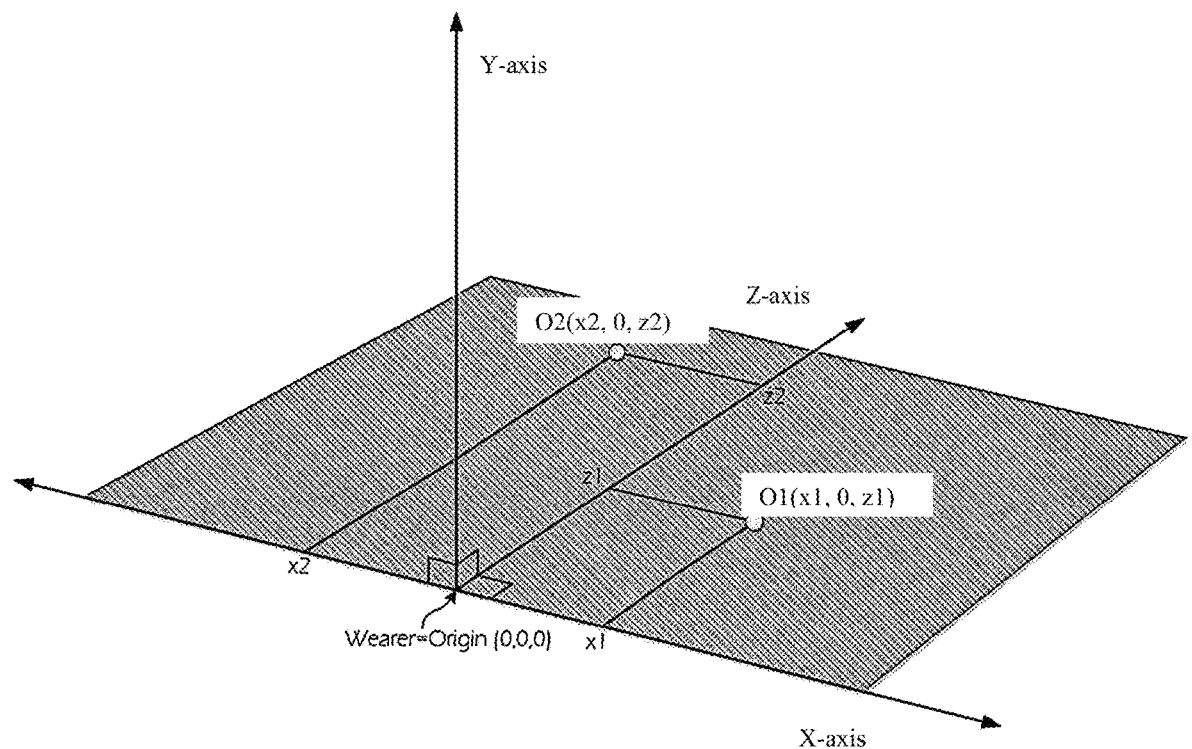
FIG. 2 shows an example of plane of depth and spatial location perception in 3D Space.

FIG. 2 shows a 3D co-ordinate system with the wearer positioned at the origin and is facing towards the z axis. This device provides the perception of depth along the positive Z-axis in the figure above (i.e., in the front of the wearer), and perception of spatial location with respect to the wearer (e.g. to the left, right, or center to where the user is facing) along the X-axis (i.e., horizontal axis).

This method provides perception of multiple objects simultaneously. In the figure above, for example, object O1 and Object O2 will be perceived as two separate objects on the (X, Z) plan (the horizontal shaded plan in FIG. 2).

In some embodiments, auditory/haptic transducers on this device may be arranged on a single axis, and as a result, perception along the Y-axis may be excluded. However even in these embodiments, the device's plurality of video sensors still detects the full 3D locations of objects.

In some embodiments, additional perception along the Y-axis can be added by adding additional haptic transducers, such as an extra pair of auditory/haptic transducers on the axis perpendicular to the existing transducers. In other embodiments, when this is not desired, perception may only be provided along the horizontal (X, Z) plane as noted above. In these embodiments, the system may then output a pseudo 3D perception where the plane of perception is two-dimensional. However often, since user movement is generally only confined to two dimensions, this two-dimensional projection of 3D objects is often adequate, and this simplified scheme can be useful by allowing faster response rates, and not overloading the user and haptic transducers with too much information.

Additionally, as the system continually does 3D input analysis dynamically, preferably at a real-time framerate, as the user moves in the environment (using walking movements and head movements), the user's brain integrates this data over time. This can also help the user perceive the 3D world. For example, in some configurations, the system may be configured with an optional mode that prioritizes objects in a middle plane of the vision sensors. In this mode, the user can simply tilt his head up or down to some extent to get some 3D data. The user can then instruct the system to exit this mode when this feature is no longer needed.

This pseudo 3D perception is provided primarily using haptic feedback, and optionally using auditory feedback. Note that in this document, the terms "pseudo 3D perception" and "3D perception" may often be used interchangeably.

Differences Between being a Perception Device, and a Turn by Turn Device:

Unlike some prior art devices that prompt users to "turn left" or "turn right" based on navigation map data, this device instead provides the perception of the world around the wearer—letting the user perceive where objects are located—and indirectly guides the user to move around the world in the manner a normally-sighted person would; using their own judgement to avoid or approach objects based on perception.

In some embodiments, the invention may use audio or alternative haptic transducers to output information pertaining to any of the identity or distance to any of the ID tagged reference objects, and/or to the presence or distance to any obstructing obstacles objects that might come between the ID tagged reference objects and the user.

Thus, in some embodiments, audio outputs may also be used to announce special detected objects (e.g. identified tagged objects). Alternatively, if the user prefers to use his or her ears for their normal purposes, the identity of special detected objects might be output to optional and alternative haptic transducers, such as third party electronic handheld braille alphabet output devices and other tactile graphics displays (TGD).

In some embodiments, when an object like a stair or a door frame is detected, the user may be notified with a voice prompt or alternative haptic transducer output informing them of the presence of such specific objects.

Here pseudo 3D perception of depth and spatial location, when used, can work in conjunction with these prompts. For example, when the voice prompt or alternative haptic transducer output announces a stair, the auditory and/or haptic perception can be used exclusively for the stair if there is a clear path to it. In case of an obstacle in the path, the regular 3D perception output continues and the announcement of the special object may be delayed until there is no immediate obstacle (e.g. an obstructing obstacle) in the wearer's path.

Thus, the system can be configured to generate any of a haptic or audio warning signal for such obstructing obstacles; and/or suppress haptic output for those identified tagged objects that are blocked by the obstructing obstacles.

In some embodiments, the system may subtly change the 3D perception effect for special objects (e.g. identified tagged objects) to make it easy for the wearer to recognize and differentiate between obstacles and special identified tagged objects.

The combined result of this method of 3D perception is that the wearer is guided to the special identified tagged object while avoiding obstacles without explicitly prompting the user to turn left or turn right, as commonly done by certain prior art navigation devices.

As previously discussed, such additional voice prompt audio features are optional and/or may be disabled by users without diminishing the rest of the sensory perception functionality of the device.

Some of these aspects will be discussed in more detail shortly in the upcoming audio processor module discussion and sensory perception with haptic feedback discussion.

Note that when implemented, the invention's pseudo 3D perception output is very different from the perception of the world that a normally-sighted person would have. This perception can at best be compared to a visual perception if the vision was limited to a certain distance (say 6-10 feet), and if only the closest points of 3 to 5 nearest objects were visible at any given time. This is no match for normal visual perception; however, it does improve the overall ability of the visually impaired to move around the world, much like normally-sighted people.

In the next sections, some of the major components are described in more detail:

Plurality of Video Sensors: Vision Band with Optional Audio Attachment

In some embodiments, as previously discussed, the plurality of video sensors may be mounted onto a vision band or alternative eyeglasses type device. In this embodiment, the various video sensors are configured to be worn on the user's forehead, preferably above and/or near the user's eyes. The idea is to configure the video sensors mimic what a human wearer with normal sight would see. As previously discussed, in some embodiments an audio component may be mounted as an optional attachment to the vision band, or it may be mounted separately.

FIG. 3 shows a head worn video sensor band (vision band) (100a) with an optional audio attachment. In this particular embodiment, little attempt has been made to mimic the normal cosmetic appearance of standard eyeglasses, but of course, alternative configurations designed to mimic the appearance of common headgear such as sunglasses, eyeglasses, visors, and the like may also be done. Other versions may mimic the appearance of hats or caps.

TABLE 1

List of video sensor band components

| Number | Name | Description |
| --- | --- | --- |
| 102 | Pivot Joints | Pivot joints to rotate the main camera segment 106. This allows adjustment to the tilt of cameras (to account for different user's walking gait and height) |
| 104 | Camera sensors A and B | Camera sensors A and B provide stereo images to the Hub |
| 106 | NIR LED | Near Infrared (NIR) LED is used for illumination in low-light conditions |
| 108 | Main Camera Segment | The main camera segment houses the printed circuit board that mounts the electronic components like 104 and 106 |
| 110 | Side-arms | Detachable side-arms. With or without optional headphones such as bone conduction |

The diagram in FIG. 4 below shows one embodiment of the electrical connectivity of various components of the vision band (100, 100a). In this embodiment, images from video sensor A (104a) and video sensor B (104b) are compressed by an optional video compressor processor (image packer 112) before being sent via a connector or interface (114) to the image processing processors, here located on an external hub device (200). For lower light purposes, the system may also have an illumination source, such as a visible light or near infrared (NIR) light emitting diode (LED) 106a.

The optional audio headphones may wirelessly connect to the hub (and hence are not shown in the diagram).

Figure 4:
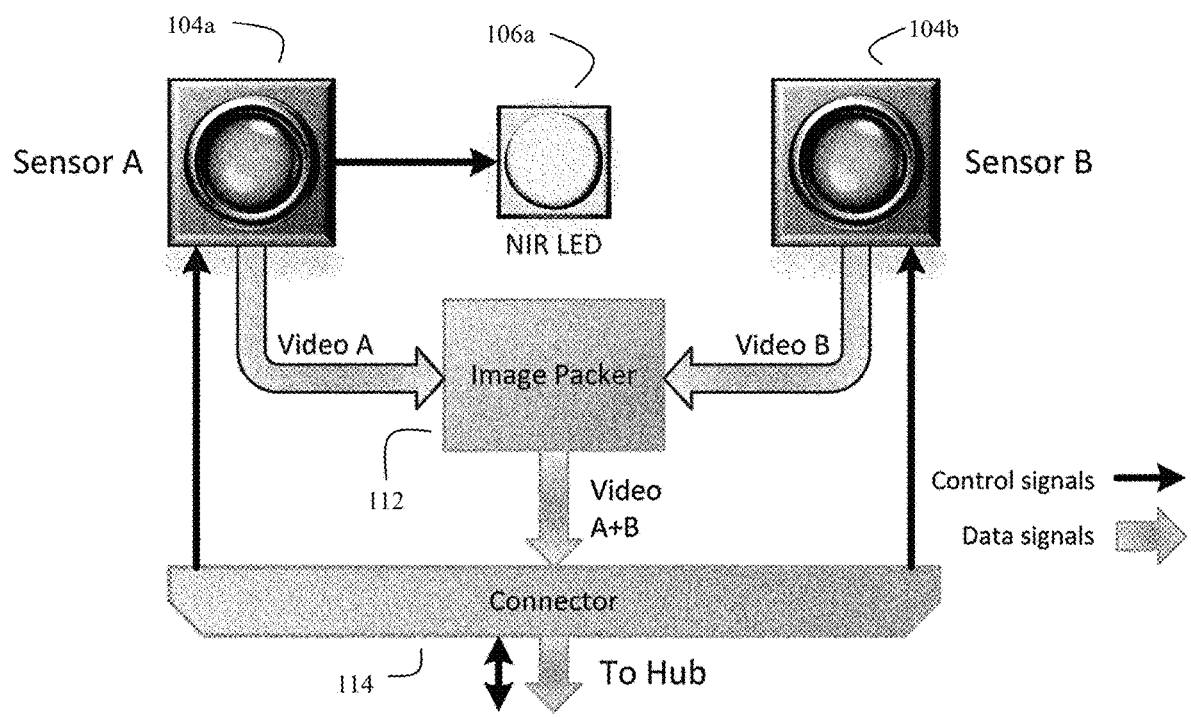
FIG. 4 shows an embodiment of the vision band's electrical connections and physical placement.

In the diagram in FIG. 4, and rest of the document, 'sensor' or 'camera sensor', or "video sensor" is used for brevity; however, these terms are meant to include not only the actual CMOS camera sensor or other image sensing chip, but also the optical lens assembly that is usually the part of the camera module (104a, 104b).

Stereo Camera Video Sensors

Apart from electrical connections, FIG. 4 also shows one embodiment of a physical arrangement of the plurality of video sensors, where here, the plurality is two stereo camera sensors (104a and 104b). In this embodiment, these video sensors are arranged in line to provide binocular vision, and configured with an orientation and separation much like human eyes.

These two video sensors will usually return sufficient image information to calculate depth information of the scene captured by the cameras. In humans with normal sight, the brain perceives depth primarily from this binocular vision using stereopsis. The visual cortex of the human brain uses the disparity between the A and B images to create perception of depth. According to the invention, computer vision algorithms replace the complex processing done by human brain to calculate depth information from the A and B images relying on disparity between the views.

Figure 5:
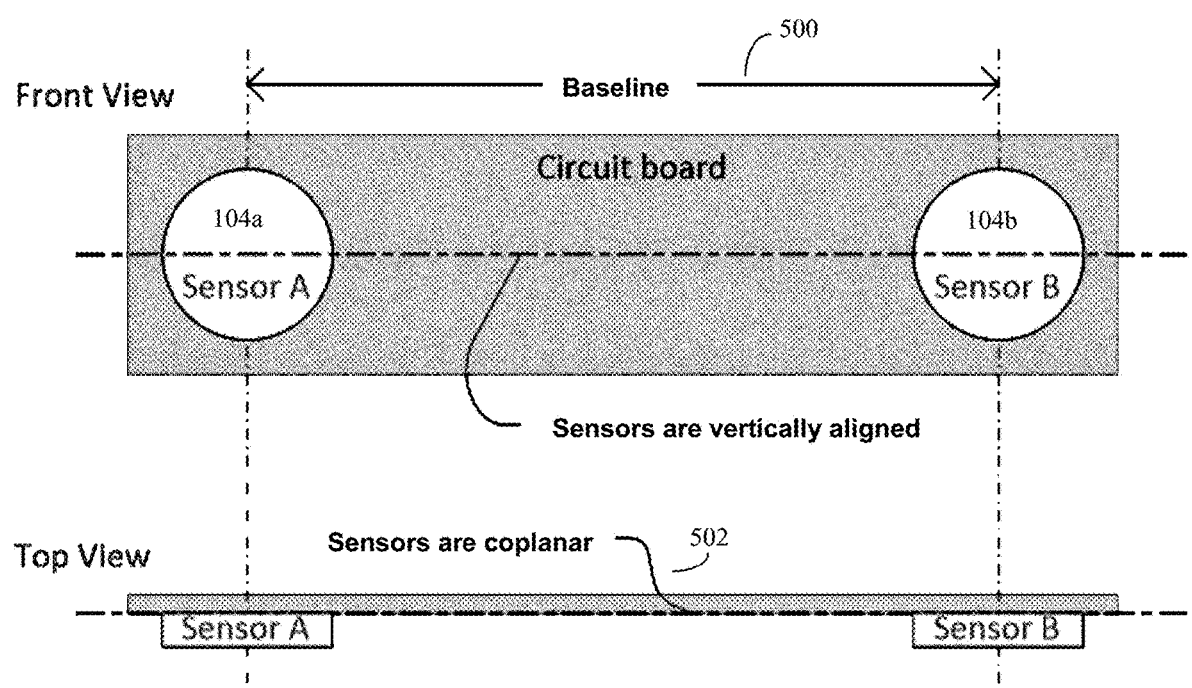
FIG. 5 shows an example of how the vision band's video sensors can be physically placed.

FIG. 5 shows an example of how the device's video sensors can be physically placed.

According to this scheme, the distance between the center of the two camera sensors (104a, 104b) is called a "baseline" (500) as shown in FIG. 5. Following are two main effects of the baseline on depth calculations in the various computer vision algorithms:

1. Larger baseline improves the maximum depth range: Given a baseline, the effective stereo convergence angle (the angle formed between the lines drawn from the centers of the two camera sensors to the object in view) to a distant object is smaller compared to the effective stereo convergence angle to a closer object. This results in less disparity information for distant objects for a given baseline. Thus, to improve depth perception of distant objects (or to increase maximum effective depth range), baseline must be increased.

2. Smaller baseline improves the minimum depth range, or the minimum distance for which depth can be reliably calculated. This is because a smaller baseline provides better overlap of views in both camera sensors. With smaller baseline, the objects can be closer to the camera system while they are still visible from both camera sensors (a requirement for stereopsis). Another side benefit of smaller baseline is that it reduces occlusion—the artefact when certain parts of the scene are visible in one view but occluded in the other view.

Considering the impact of baseline, the best method to perceive depth would be to either have a variable distance between the two camera sensors, or else employ more than two camera/video sensors, to get optimal range of depth detection.

However, for two video camera embodiments, the baseline may be an empirically chosen fixed distance configured to provide a good overlap of the view between the A and B stereo images, while also providing good depth information of distant objects.

The device needs a reasonable maximum depth range to ensure that the system detects objects in time before the wearer may stumble into them. Since, average walking speed of humans is 3 mph, or 4.4 ft/s, a maximum range of 6 ft to 7 ft is reasonable as it ensures detection of objects in time, even after a reasonable processing delay. We have found that a 4 cm to 5 cm (1.68 in to 1.97 in) baseline is a good balance for this embodiment. This separation empirically translates into a range of 1 foot to 7 feet of usable depth information. However longer distances (e.g. 10 feet or more), or shorter distances (e.g. 5 feet or less) may also be chosen.

Other Stereo or 3D Image Analysis Considerations

Use of a plurality of video sensors, such as two video sensors, arranged for stereo vision enables the system's hub to calculate depth information in the form of a depth map. There are certain requirements that help the system precisely calculate depth maps:

1. In a preferred embodiment, as is shown in FIG. 5 (502) the various video sensors are coplanar. When camera sensors are coplanar, image disparities occur in such a way that for a given point in one image, a corresponding point can be found in the other image along the same horizontal line. This allows disparity calculation algorithms to work both faster (as the search is limited in one dimension) and more reliably (more reliably because there is a less likelihood of finding a false match).

Note that alternative configurations may also be used. Additionally, certain algorithms, such as deep learning algorithms, that are also less sensitive to this constraint that the video sensors be coplanar may also be used.

2. In a preferred embodiment, with two video sensors, both A and B camera sensors are vertically aligned. Here, however, various post-calibration rectification methods (see below) can correct for at least some physical and/or optical misalignment.

3. Typically it is important to calibrate the various video sensors to as to find the so-called intrinsic and extrinsic parameters of the camera system. When this is done, various computer processors and computer vision algorithms, in some embodiments located in the hub (200) can, for each image, perform what is known as stereo rectification. Stereo rectification can, for example, use the intrinsic and extrinsic camera parameters to remove distortions in the images and ensure that disparities in the A and B stereo images are on horizontal lines.

Electrical Considerations for 3D and Stereo Vision

For optimal 3D and stereo imaging, ideally images from the various video sensors, such as the A and B sensor (104a, 104b) images should be captured at the same times, ideally at precisely the same times. This helps ensure that the only difference between various two images is the viewing angle.

To help ensure precise timing, in some embodiments, various techniques may be employed to help synchronize the various camera sensor chips. For example, the circuitry may be configured so that all video sensors are driven by the same clock signal and are programmed such that their electronic shutters will fire exactly at the same time for every frame.

In some embodiments, for even tighter synchronization, all of the critical electrical wire traces on the printed circuit board (PCB) of the vision band can be fine-tuned and their lengths can be matched to make sure that the various camera chips receive the control signals precisely at the same time.

FIGS. 6A and 6B shows an example of trace mapping, here using partially traced printed circuit boards.

FIG. 6A above shows a partially traced printed circuit board (PCB) layout design where some signals are input signals to be traced to both the sensors (here the traces for sensor 104a are shown as 104c, and the traces for sensor 104b are shown as 104d). Most signals can be approximately matched to within a few millimeters. However, critical signals, such as a clock signal, need to be matched more precisely within a fraction of a millimeter. FIG. 6B highlights such a critical signal trace, which is precisely matched within a fraction of a millimeter by tracing the required side of the trace (left side in this case) as meandered (wavy) trace line (602).

Although more than two video cameras may be used, using two video cameras optimized for stereo mode helps keep the cost of the device down, and power consumption low. In addition to using more than two video cameras, alternative video sensors, such as Time-of-Flight depth cameras or structured light based depth sensors systems may alternatively be used.

Video Camera Framerate Considerations

Continuing with the two video camera embodiment, visual information in the form of stereo images from sensors A and B can be processed by the hub (200) or equivalent circuitry and algorithms to calculate a depth map which, along with object detection and object recognition processors, allows the rest of the system to provide perception of the depth and spatial location of the obstacles/objects in the path of the wearer.

Since the invention will be used by people while walking, the various video cameras should ideally capture the frames at a sufficient framerate to provide continuous perception of the world around the wearer. If the framerate is too slow, it is likely that the device will not be able to provide information to the wearer in time to avoid an obstacle. Conversely, if the framerate is too high, it would impose an unnecessary computation burden on the system and will consume too much power. To avoid that, framerates of around 10 fps (frames per second) to 15 fps are a good tradeoff. These provide a sufficiently continuous perception of the world around the wearer, while keeping the computation requirements manageable. However other frame rates, such as frame rates below 10 fps, or frame rates higher than 15 fps, may also be used.

Optional Built-in Illumination

Ambient light may not always be sufficient for the device's video sensors, and in some embodiments it can be useful to incorporate additional light sources, often provided by one or more light emitting diodes (LED). Although visible light sources may be used, use of light that is invisible to the human eye, but not to video sensors (such as infrared light, in particular near infrared (NIR) light), can be useful. This can provide enough light to allow the video sensors to operate, while render the system less conspicuous to other individuals.

Thus, in some embodiments, the system's vision band can include one or more LED (light emitting diode) that provide illumination in the near-infrared (NIR) spectrum of light (e.g. 750-950 nm wavelength). This wavelength is useful, because although not visible to human eyes, most CMOS video camera sensors have good response characteristics to the NIR wavelength light.

Thus, in some embodiments, the system may employ one or more built-in NIR LED to illuminate the scene in low light and night time conditions. This increases usability of the device in such situations.

Figure 7:
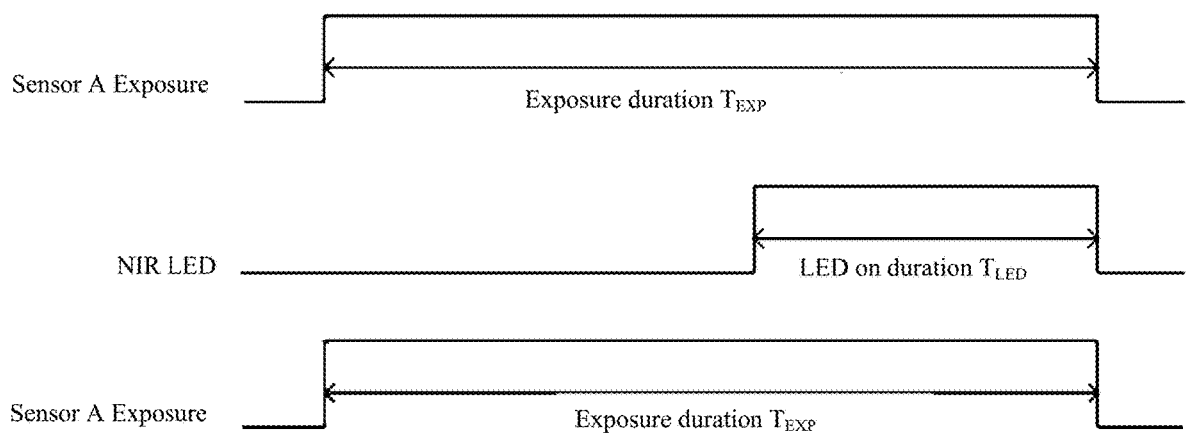
FIG. 7 shows an example of an illumination timing diagram for an optional near infrared LED light source.

FIG. 7 shows an example of an illumination timing diagram for the vision band's optional near infrared LED light source.

In some embodiments, the system's light sources may be switched on and off either under user control, or automatically. As an example of automatic control, when low-light conditions are detected, the system can switch on the NIR LED(s) during the exposure time of each frame captured by the camera sensors, and then turn the LED(s) off, as shown in FIG. 7.

$T_{EXP}$ is the total exposure time for both sensors. $T_{LED}$ is the control signal driven by sensor A to switch on NIR LED. Since both A and B camera sensors are synchronized by design, sending the on/off control signal from either of the camera chips, whether A or B, will work equally well. NIR LED is switched on at the trailing end of exposure to illuminate the scene at the last moment and 'freeze' the movement in the scene if any. Switching the LED at the beginning of the exposure may lead to a blurry image or an image with "ghost trails" if there is motion in the scene after the NIR LED is switched off. Both $T_{EXP}$ and $T_{LED}$ can be independent, programmable values chosen by the hub firmware.

Figure 8:
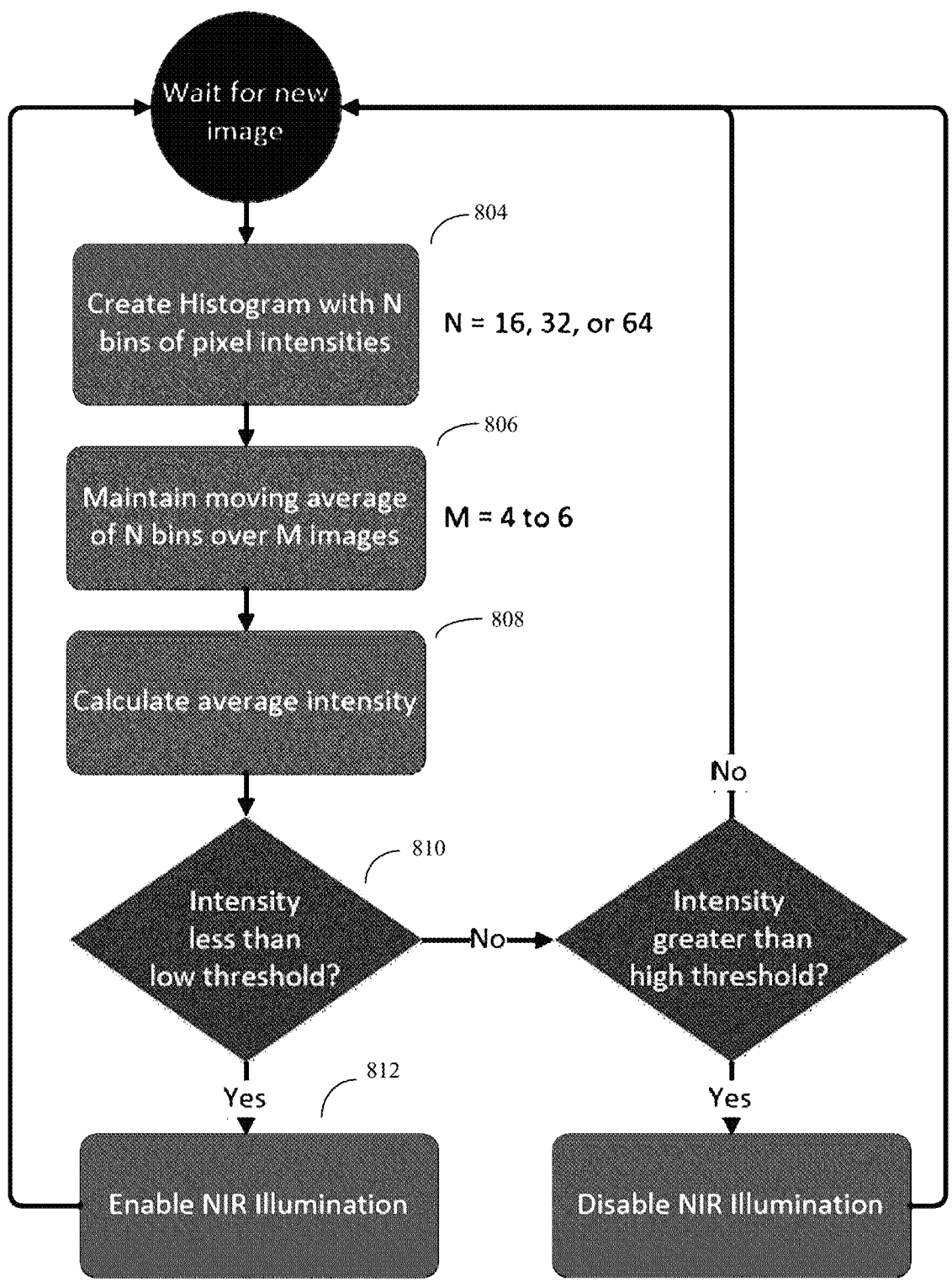
FIG. 8 shows an example of an algorithm that can be used to enable or disable an optional low-light illumination system.

FIG. 8 shows an example of an algorithm that the device can use to enable or disable an optional low-light illumination system.

In some embodiments, an automatic low light detection algorithm can be implemented by the hub or by the vision band. An example of one such algorithm is shown in FIG. 8.

1. (804): Calculate a histogram of N predetermined number of bins based on pixel intensities per frame. The number N can be 16, 32 or 64, for example. Smaller number of bins makes intensity calculation faster at the expense of less information for other purposes (the histogram can also be used for manually overriding the exposure of the sensors)

2. (806): Create a moving average of such histograms. Calculating moving average involves adding the new values of the histogram bins to the existing bins and calculating averages for each bin. Taking a moving average over M predetermined number of images reduces chances of making inaccurate decisions based on electrical or other glitches in the camera capture. M can be a number between 4 and 6.

3. (808): For every frame calculate average intensity of the scene based on the histogram.

4. (810) When the average intensity falls below a predetermined threshold (low threshold), enable low-light illumination (812).

5. (812): When the average intensity goes over a predetermined threshold (high threshold), disable low-light illumination.

6. The low and high programmable thresholds can be selected to allow hysteresis in the system so that the low-light illumination doesn't get enabled or disabled too rapidly. In other words, once the low-light illumination is enabled, it will remain enabled until the average intensity rises above the difference between the high and low threshold.

Optional Video Compression (Image Packer) and/or Use of Wired/Wireless Connectors In some embodiments, an optional video compression or "image packer" processor in the vision band may be used to combine various images, such as the A and B images, coming from the camera video sensors. This can then be used to send out the resultant video signal, at a selected framerate and/or compression ratio, other computer processors used for computer vision purposes, which may be located on the hub or elsewhere.

When a wired connection is used, video compression is often less important, or even not needed. Such a wired connection can be any industrial standard connection such as a USB connection, or alternatively a different or even custom wire connection. Here a custom connection that bundles a serial LVDS (Low Voltage Differential Signaling) connection for video data, and a control protocol like I2C (Inter-Integrated Chip) protocol for programming from the Hub, or alternative connection may be used. Such a wired connection can also be potentially used to provide power to the vision band, reducing or eliminating need for a separate battery here.

If use of a wireless connection, such as a Bluetooth connection, WiFi connection or wireless USB connection is desired, then higher amounts of video compression may be needed.

Assuming a framerate of 15 fps and the sensor image resolution of 640×480 in Bayer encoded data (which uses 2 bytes per pixel), the required connection bandwidth is 2*640*480*8*2*15=147 Mbps. For a larger sensor or higher framerate, the bandwidth requirement increases proportionally. Absent compression, there are few wireless protocols that are practical for these types of high bandwidth requirements. Also, such wireless modes can require more power. Thus, although wireless connections may be used, in some embodiments it may be preferable to use a wired connection, thus reducing the power and battery requirements on the vision band, and also reducing weight and improving user comfort. Of course, if the computer vision circuitry can be implemented in the vision band, then this compression problem can be avoided.

Optional Audio Outputs, Such as Via an Optional Audio Attachment to the Vision Band Generally, the invention uses haptic feedback as the primary output method to provide the perception of the world. This is because visually impaired people use their ears to receive sound cues about the world around them, and it is often not desirable to compromise this natural system of audio perception.

However, in some embodiments, it can be useful, at least as a secondary and optional method, to also map the information pertaining to the 3D object locations of at least some of the identified tagged objects and generic outputs onto audio transducers (e.g. audio speakers) and or alternative haptic transducers (such as the previously discussed handheld Braille output devices).

Users can disable this optional feature of sensory perception through audio or alternative haptic transducers; this will not diminish the functionality of the device as the primary sensory perception is provided via the haptic band.

In some embodiments, the vision band's main camera segment (FIG. 3, 108) can be configured to accept or incorporate at least one, and often a pair of, detachable side-arms with audio outputs. This can be simple headphones or earplugs, or may comprise more complex audio output devices such as wireless Bluetooth bone conduction headphones (FIG. 3, 110).

Here, the advantage of bone conduction headphones is that these allow the users to continue to hear most sounds normally through their ears, while the device sounds are heard through bone conduction. These bond conduction headphones can be made detachable, so that users who do not want to use audio can simply connect alternative and lighter "dummy" side-arms that don't have audio output as a replacement, non-audio, attachment.

FIGS. 9A-9C shows various close-up views, from different angles, of the device's optional audio attachment, here configured with a headphone adapted for placement with the user's left ear. In particular, FIG. 9A shows a rendering of the left ear audio attachment, here shown with a bone-conduction headphone. In some embodiments, this audio attachment may be configured such that the bone-conduction pad of the headphone can press lightly against the cheek bone.

Main Computer Vision Processing Section, or "Hub" Module

As previously discussed, in some embodiments of the invention, most or all of the computer processing used for the various computer vision techniques may be implemented in a central processing module or "hub" (200). This "hub" then interfaces with the vision band and the haptic band to form a complete DVIA device or system.

In general, the main requirements for the computer vision module, which may be located in a "hub", in the vision band, or even on the haptic band, are that the module:

1. Have sufficient computation power to process the input stereo images to compute depth data (depth map), detect nearby multiple objects, and perform object recognition (this can be done using a convolutional neural network or other computer vision method).

2. Send the 3D location of the various objects to the system's haptic band (this can be done using a Bluetooth wireless connection or other method).

3. Optionally sends generated audio output to headphones or other audio output devices (this can also be done using a Bluetooth wireless connection or other method).

In a preferred embodiment, the computer vision module will be configured so that it consumes low power, ideally low enough so that when combined with a suitable battery, the system can operate for several hours—preferably on the order of a day or more.

In some embodiments, the "hub" vision processing module will comprise various sub-components such as a computation hardware board, user interface elements, other hardware components, hub firmware (e.g. various types of computer vision software), and a physical enclosure.

Computation Hardware Board

The module's computation hardware board can be viewed as being the main computer vision module of the device. In some embodiments, this board may comprise computer processors (e.g. System-on-Chip (SoC) processors), memory such as DDR RAM memory and non-volatile storage (e.g. FLASH memory), other sensors such as an accelerometer for motion detection, optional battery charger, connectivity devices (e.g. wired or wireless interfaces to the system's vision band and haptic band components).

In some embodiments, this hardware board can be a printed circuit board (PCB) that hosts some or all the electrical components described above.

System-On-Chip (SoC) Processor

A typical System-on-Chip (SoC) device contains one or more central processor units or processor cores, on-chip memory, a collection of peripherals that provide various system functions (e.g., USB controller, I2C bus controller, DDR memory controller, etc.). In addition to these typical components, special purpose SoCs may contain FPGA (Field Programmable Grid Array) or GPU (Graphics Processing Unit) suitable for general purpose computing (GP-GPU). The FPGA and GP-GPU provide acceleration of certain computations that would otherwise take much longer on a general-purpose processor core of the typical SoC; we will refer to them as FPGA-SoC and GPU-SoC for brevity.

Memory

Although many SoC designs also contain a small amount of on-chip static random access memory (SRAM); in some embodiments, this may need to be supplemented to store the large amounts of data used in computer vision applications. Thus, use of additional memory, such as by adding additional DDR Random Access Memory (DRAM) on the board as an external component, may be used. Many SoC designs contain DDR controllers that can interface with this external DRAM to provide access to the programs running on the processor core, as well as the programmable logic when FPGA-SoC devices are used.

Similarly, the hardware board can also contain appropriate amounts of non-volatile storage that can retain its values even after power is removed. This is used to store the device's operating system files (e.g. Linux or other type OS), calibration data, computer vision software/firmware, and other device firmware.

Accelerometer

In some embodiments, this "hub" unit (or any of the other units) may also comprise an accelerometer, which can be used to detect when the hub module (and thus presumably the user) is in motion or not. This can help determine when the user is not moving, and can be used to switch the system into a reduced power mode during times of low movement.

Connectivity

As previously discussed, connectivity between the hub module and the other components (vision band, haptic band) may be provided by any of a wired connection or a wireless connection.

Wired Connections

Although wireless methods may be used, in some embodiments, it may be useful to provide a wired connection to carry video data from the vision band to the hub module, and this may also be used to carry control information from the hub module back to the vision band. As previously discussed, wired connections often allow for higher data transfer rates, can use less power, and can also transfer power from hub module batteries back to the vision band. Wired connections may also be used between the hub module and the haptic transducer band as well.

Wireless Connections

In some embodiments, wireless transceiver implemented wireless connections, such as Bluetooth, WiFi, ZigBee, wireless USB, and the like may be used for some or all of the connections between the hub module and any of the vision band or haptic band. Wireless connections may also be used to transmit data to optional audio outputs or Braille alternate haptic transducer outputs.

Battery and Power Considerations

In some embodiments, the hub module may also house, or be connected to, a battery, such as a rechargeable battery. Ideally this battery will be large enough to power the unit for at least several hours or more. In some embodiments, a battery charger circuit may also be included on the hub module's hardware board.

User Interface

User interface elements may be included on any of the vision band, hub module, or haptic module. Although in this discussion, we will mostly talk about user interface elements located on the hub module, these particular examples are not intended to be limiting.

In some embodiments, at least some "main" user interface elements can comprise physical buttons to control the device functionality. These buttons can include device power on or off buttons, effects intensity increase or decrease, wireless pairing with other units (such as the haptic band, etc.). Other user interfaces can include voice recognition audio inputs, touchpads, and the like, which can be included in any or all of the various units.

Hub Module Firmware

The computer processors in the hub module must carry out a number of complex functions in parallel. Here, use of operating systems as the main software backbone, such as the popular Linux open-source operating system, may be useful. In the examples discussed herein, the various hub module functionalities described herein may be implemented as various applications or programs running this operating system. In some embodiments, the hub module may be a fully functional computer system, and indeed some or all of the functions described herein may be implemented on smartphone devices or other handheld computerized devices, such as the popular iOS, Android, Windows, or other type devices.

Figure 10:
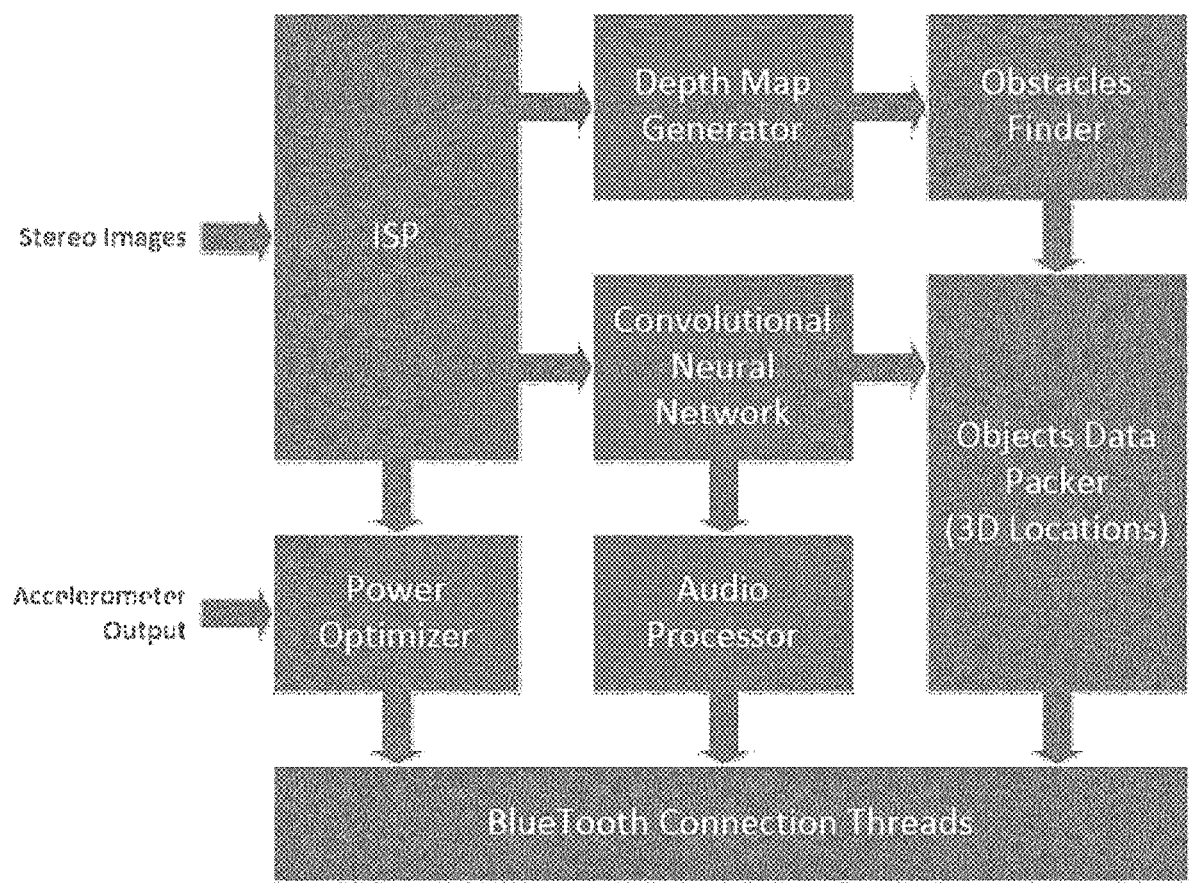
FIG. 10 shows a block diagram of an embodiment of the device where some of the various main processing components are mounted in a "Hub" that may be physically separate from, but in data communication with, the device's vision band and the device's haptic transducer band.

FIG. 10 shows a block diagram of an embodiment of the DVIA invention where various firmware components are mounted in the device's hub. This shows some of the main firmware components and the data flow among them. These main components are described in the next sub-sections.

Image Signal Processor (ISP)

In some embodiments, the vision band performs little or no computer vision processing on the images before transmitting them to the hub module. Assume here that in this embodiment, the hub module receives images in the form of video that contains both A and B stereo images.

The ISP module can separate these A and B images from the video, usually on a per frame basis, and perform various types of image corrections. These image corrections can include an optional stereo rectification step to correct for video camera distortions, often by using system calibration data previously stored in non-volatile storage memory.

Next object depth data is obtained. This can be done by using a depth map generator as well as a Convolutional Neural Network for object detection and recognition.

FIGS. 11A and 11B shows an example of an image from the device's video sensors, here shown before and after an image rectification process.

FIGS. 11A and 11B below shows an example image before (11A) and after (11B) rectification. Observe how distortion is corrected in the after-rectification image (11B). The distortion is more prominently shown against the line on the edge of the door in the raw image; the distortion free door edge can be seen matching the line in the image after rectification. The dark areas around the image after the rectification are removed to reveal a smaller usable image for further depth map calculations, as indicated by the rectangular box (1100) in the FIG. 11B below.

Depth Map Generator

Figure 12:
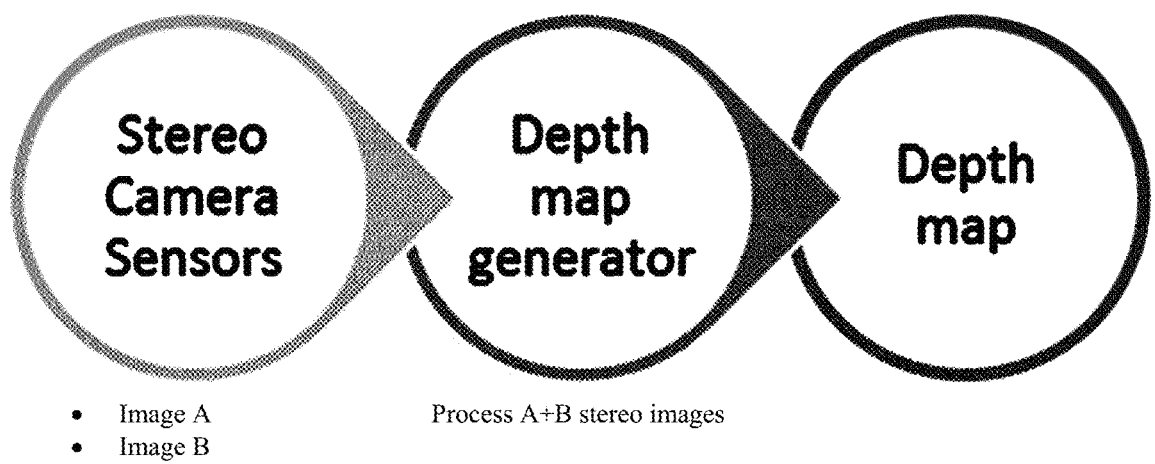
FIG. 12 shows an example of a depth map generation process.

FIG. 12 shows an example of a depth map generation process that may be used by the device.

In some embodiments, 3D location data can be obtained by using depth map generator methods. In this embodiment, the hub module may calculate a depth map from the A and B stereo images coming from the vision band, as shown in FIG. 12.

A depth map is a two-dimensional (2D) array that contains depth information at every location. A two-dimensional image, and its corresponding depth map, together provides full three-dimensional (3D) information of the visible scene. For example, location at row 0, column 0 of the depth map would contain distance of the part of the object/scene at that location corresponding to one of the A or B images (typically image A).

FIGS. 13A, 13B, and 13C shows an example of pair of stereo images from sensor A (FIG. 13A) and sensor B (FIG. 13B), and the corresponding depth map (FIG. 13C) calculated from them. In the depth map image, objects closer to cameras appear darker (smaller distance=darker pixels) and objects farther from cameras appear brighter (larger distance=brighter pixels).

Depth maps can be generated by various methods, including Convolutional Neural Networks (ConvNets) methods, OpenCV (Computer vision) algorithms, and the like, available online through the OpenCV (Open Source Computer Vision Library) and other sources. Examples of such OpenCV algorithms include StereoBM (Stereo Block Matching) methods, SGBM (Semi-Global Block Matching), and the like.

Examples of methods to implement the depth map generator include GPU (graphics processing unit) and FPGA (field programmable gate array) type methods.

Depth Map Generation Using GPU Methods

In some embodiments, depth information may be obtained by calculating stereo disparity using block matching methods. Here use reference computer vision algorithms as defined in the OpenCV library may be used.

These methods, which can be implemented on SoC chips containing GPU hardware (GPU-SoC) can be done by optimizing the OpenCV library for the specific SoC and its GPU being used.

This can be done by the OpenCV library code using SoC specific compiler options, and utilizing the GPU acceleration options in the OpenCV library code to achieve faster speed on the GPU-SoC.

These methods generally do not require modifying the underlying OpenCV functions, while still providing great increases in computation speed over conventional computer processors. Similarly, ConvNet implementation can also be directly accelerated using GPU-SoCs without making changes in the code.

Depth Map Generation Using FPGA Methods

In other embodiments, alternative methods, suitable for SoC chips containing FPGA circuits (FPGA-SoC) may be used. Here, an FPGA hardware implementation of the OpenCV function or convolutional neural network (ConvNet) methods using FPGA programmable logic circuits may be done.

Such FPGA methods generally operate by implementing a hardware description of the depth map functionality, using a hardware description language, and synthesizing appropriate FPGA circuits using FPGA synthesis tools to produce the final gate level logic design. This gate level logic design is then written into the FPGA (in other words, FPGA is programmed with this specific design). The software running on the SoC processor core(s) can then utilize the hardware/software application programming interface (API) of the FPGA-SoC to drive this hardware logic. This can be done by sending the A and B stereo images as input, and receiving (as output) the depth map output back from the FPGA hardware.

The advantages of such FPGA or other custom circuits include very fast computation speed (relative to general purpose processors, and even certain GPU circuits). Additional advantages include low power consumption. This is because FPGA or other custom hardware can be designed to carry out specific tasks with a minimum amount of energy going into gates and circuits not essential to this specific task.

Advantages of Hardware Acceleration

Both FPGA and GPU methods described above provide significant amounts of acceleration (computation speed increase) as compared to general-purpose processors. This in turn helps reduce latency (e.g. reduce the delay from the time input images are captured to the time haptic perception output is provided to the user). In general methods that reduce latency are highly desirable, since higher latency can reduce the usability of the invention.

Image Recognition Algorithms

In some embodiments, the invention may further employ image recognition algorithms, such as any of convolutional neural network methods, geometric modelling methods, and single shot multibox detection SSD frameworks.

Convolutional Neural Network (ConvNet) Methods for Object Detection

Object detection is a well-known problem in computer vision and artificial intelligence research. Object detection, in fact, involves solving two other problems as sub-problems:

Localization: This task locates one or more objects in an image, and determines where the object(s) are and what shape they are. This answers the question "where is the object?"

Classification: This task classifies the categories of one or more prominent objects in an image. This is also known as the recognition task. This answers the question, "what is the object?"

Object detection requires using the above two techniques for multiple objects, thereby detecting the existence of potentially multiple objects in the scene, localizing (e.g. often using a bounding box), and classifying at least some of detected objects.

Various computer vision methods may be used for the invention. These include the methods of P. Viola and M. Jones, "*Rapid object detection using a boosted cascade of simple features*," in Proceedings, IEEE Conference on Computer Vision and Pattern Recognition, 2001.

However, in a preferred embodiment, convolutional neural methods, such as AlexNet type methods (A. Krizhevsky, I. Sutskever and G. E. Hinton, "*ImageNet Classification with Deep Convolutional Neural Networks*," Advances in neural information processing systems, 2012) may be used. In particular, Deep Learning using convolutional neural networks (ConvNets) methods can be useful, because these methods are able to "learn" the features from images as they are trained, and can also be used to include other required tasks like classification and localization as part of the single network. Examples of this latter approach are taught by R. Girshick, J. Donahue, T. Darrell and J. Malik, "*Region-based convolutional networks for accurate object detection and segmentation*," IEEE transactions on pattern analysis and machine intelligence 38.1, 2016; R. Girshick, "*Fast R-CNN*," Proceedings of the IEEE International Conference on Computer Vision, 2015; and P. Sermanet, D. Eigen, X. Zhang, M. Mathieu, R. Fergus and Y. LeCun, "*Overfeat: Integrated recognition, localization and detection using convolutional networks*," arXiv preprint arXiv:1312.6229, 2013.

Figure 14:
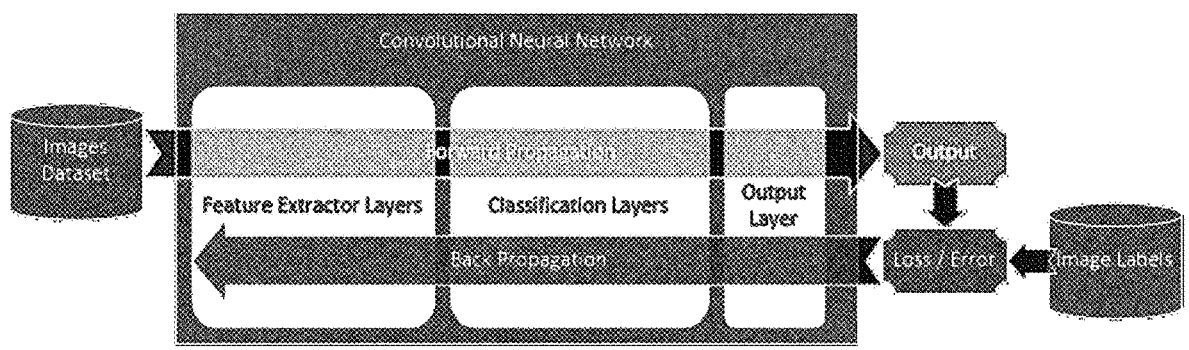
FIG. 14 shows an example of a convolutional network (ConvNet) training framework, which may be used for computer vision recognition purposes in some embodiments of the device.

FIG. 14 shows an example of a convolutional network training framework, which may be used in some embodiments of the device's image recognition algorithms.

Specifically, FIG. 14 shows an example of a training framework for convolutional neural networks. The ConvNet can be thought of as being split into a feature extractor and a classifier; with the final output layer producing the actual desired output (e.g., identification and classification of objects). An image dataset can be used to train the network. Here the CovNet can be trained as to what objects are significant, what objects are insignificant, what objects to attempt to identify, and what objects to simply report as generic objects.

The ConvNet is typically initialized using an architecture-defined method (e.g., random initialization) before starting the training. During what is known as the forward propagation stage, the output of the ConvNet is calculated based on current values of the parameters of the ConvNet. This output is then compared against the image labels (also known as ground truth) to calculate the loss (or error); the larger the loss, the larger the deviation from ground truth.

The backward propagation stage of the training uses this loss value to change the parameters of the network with the intention of reducing the loss. Here Stochastic Gradient Descent (SGD) algorithms for back propagation may be used, such as those taught by L. Bottou, "*Stochastic gradient learning in neural networks*" Proceedings of Neuro-Nımes, vol. 91, no. 8, 1991; and Y. LeCun, L. Bottou, Y. Bengio and P. Haffner, "*Gradient-based learning applied to document recognition*" Proceedings of the IEEE, 1998.

In these methods, this process of forward propagation (or inference) followed by back propagation is repeated until the loss becomes very small. At that point, the network is considered trained.

Figure 15:
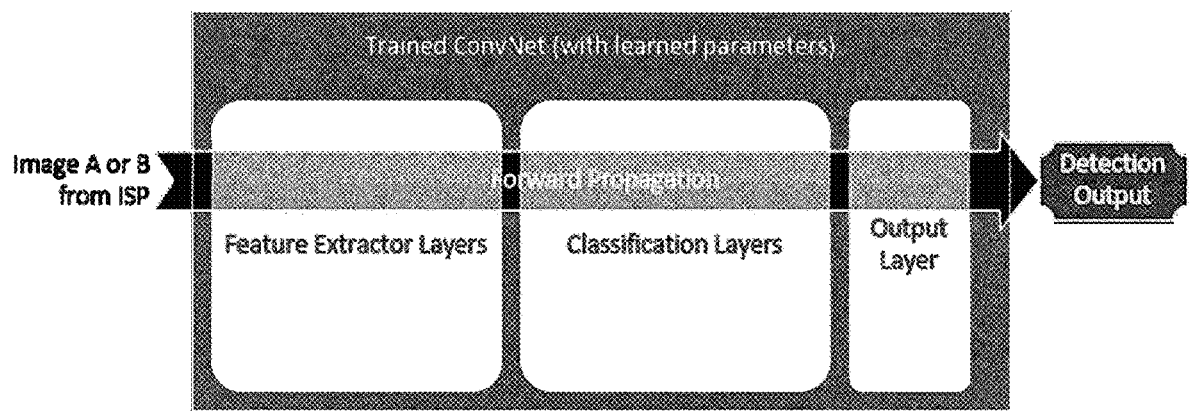
FIG. 15 shows an example of object detection using ConvNet forward propagation (inference) methods, which may be used for image recognition algorithms in some embodiments of the invention.

This trained network may then be used to generate the detection output by simply performing a forward propagation (inference) stage as shown in FIG. 15.

FIG. 15 shows an example of object detection using ConvNet forward propagation (inference) methods, which may be used in some embodiments of the device's image recognition algorithms.

Recent work now enables such methods to detect objects in real-time. Here methods such as S. Ren, K. He, R. Girshick and J. Sun, "*Faster R-CNN. Towards real-time object detection with region proposal networks*" Advances in neural information processing systems, 2015; J. Redmon, S. Divvala, R. Girshick and A. Farhadi, "*You Only Look Once: Unified, real-time object detection*" arXiv preprint arXiv:1506.02640, 2015; and W. Liu, D. Anguelov, D. Erhan, C. Szegedy and S. Reed, "*SSD: Single Shot MultiBox Detector*," arXiv preprint arXiv:1512.02325, 2015 may be used.

In some embodiments, a convolutional neural network based object detection framework method known as a Single Shot multibox Detection (SSD) framework, as described by (W. Liu, D. Anguelov, D. Erhan, C. Szegedy and S. Reed, "SSD: Single Shot MultiBox Detector," arXiv preprint arXiv:1512.02325, 2015) may be used. Since often only a small range of objects need to be identified for navigational purposes, these methods may be further modified by replacing the ConvNet used by previous SSD methods with a fine-tuned, smaller network, thus producing the object detection of object classes (often navigationally important object classes) that are specific for the invention.

Here, often the system will be trained using ID tagged reference objects useful for navigational purposes, such as objects characteristic of doorframes, stairs, street curbs, and other navigational markers (these can be navigational signs, such as "Exit" "Men", "Woman", "Open", "Closed", traffic symbols, and the like).

To help optimize the invention's image recognition techniques for navigational purposes for vision impaired individuals, in some embodiments it may be useful to further develop a custom image database, and create ground truth data specifically for the navigational objects of interest for this device (e.g., stair, doorframe, curb, etc.). This navigational image database can then be used to train this more navigationally focused ConvNet.

This trained model of this more navigationally focused ConvNet can then be optimized and converted for hardware acceleration using, for example, the previously described GPU-SoC and/or FPGA-SoC methods.

Navigationally Focused, and Hardware Accelerated, ConvNet Embodiments

In some embodiments, an accelerated ConvNet module will operate by taking one image at a time from Sensor A provided by the ISP module (which in turn gets images in the form of video from the vision band). This ConvNet module detects objects, localizes them and attempts to classify the various detected objects into one of the predefined classes of ID tagged reference objects like stair, doorframe, curb, sign, etc.

The output of the ConvNet can be a set of rectangles enclosing the detected objects (bounding boxes), and for each bounding box, when possible, an identification (ID) tag of the corresponding class of the object. When the system detects an unknown object (e.g. something that may have a characteristic shape or color pattern, but which can't be determined to be a known object), but the identity of the object cannot be determined, this can be considered by the system to be a generic object.

Here, bounding boxes can be defined in terms of following values: (x, y) coordinates of the center of the box relative to image dimensions with top left corner defined as (0,0), and the width and height of the box in terms of image pixels.

Figure 16:
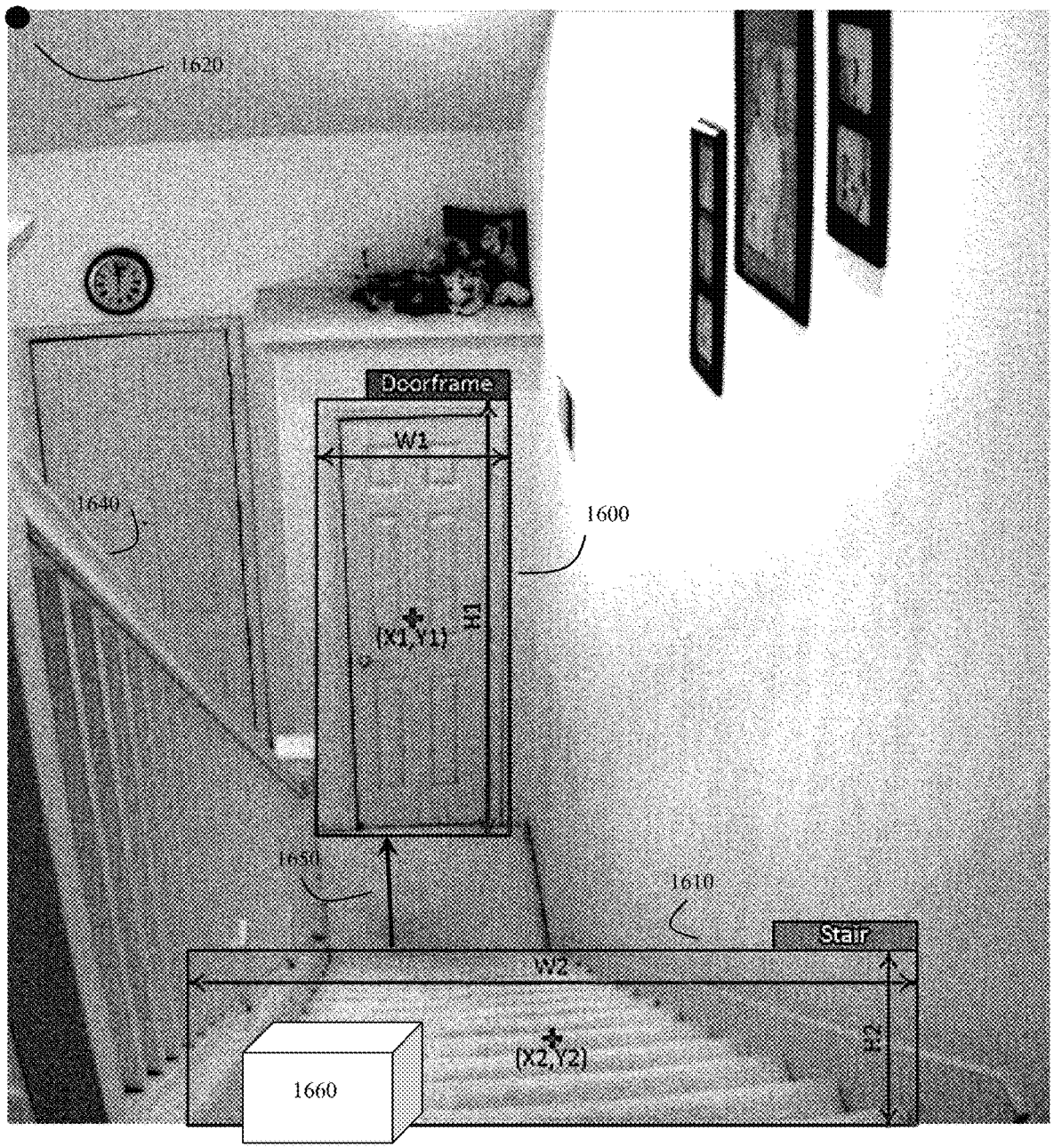
FIG. 16 shows an example of object detection of bounding boxes with object class IDs, which may be used for image recognition algorithms in some embodiments of the invention.

FIG. 16 shows an example of object detection of bounding boxes with object class IDs, which may be used in some embodiments of the device's image recognition algorithms.

In FIG. 16 below, an example image is shown with two detected and identified objects. One is a "Doorframe" object (1600), and the other is a "Stair" object (1610). The origin of the image is shown as (X0, Y0) (1620) at the top left corner for reference. The bounding box of the doorframe object (1600), as can be seen in the figure, is marked with (X1, Y1) as its center, W1 as width and H1 as its height. Similarly, the "Stair" object's bounding box (1610) is shown with (X2, Y2) as its center, W2 as its width and H2 as its height.

These four values along with ID numbers for "Doorframe" and "Stair" objects will be the output of the Convolutional Neural network based object detection and recognition module. Note that in this example, the staircase handrail or banister (1640) may be categorized as a generic object.

As previously discussed, object detection is a computationally complex task, often requiring tens of billions of multiplication and accumulation operations (MACs) per image. To implement such operations on a wearable, low power consumption, device at real-time rates (e.g. preferably 15 frames per second or greater), use of hardware acceleration methods, such as the previously discussed GPU-SoC or FPGA-SoC methods, can be very useful.

Obstacle Finding and Object Data Packing Devices and Methods

In some embodiments, the invention will further perform additional operations, such using its at least one (often hardware assisted) computer processor to those identify nearby obstacles with a 3D object location that is near (e.g. within a specified distance, such as less than 10 feet) from the user.

These embodiments will typically use obstacle analysis algorithms configured to detect nearby (e.g. near objects)

that have a position that appears to be either within a bounding box, or within a defined distance of, the bounding box of an identified tagged object.

For example, in FIG. 16, consider the stair object (1610), which is near to the user, and which has a bounding box that is within a defined distance (1650) of the door object's bounding box (1600). Depending on the system setting for "defined distance", the system may elect to define the stair object as an obstruction, or it may instead view the stair as being a non-obstructing identified object.

Note that different defined objects may have different defined distances. In general, it would appear prudent to define a larger defined distance for a stair object than might be defined for other objects. Thus, consider that in this example, the defined distance around the stair object is large enough that the bounding box of the stair falls within the stair defined distance of the door object.

That is, in this example, the stair object (1610) is near to the user, and, according to the defined distance setting, may be considered to be between a 3D location of the user and the bounding box of any of the identified tagged objects (here the door object 1600). Thus, in this example, we will consider the system to have identified the stair object as an obstructing obstacle (note, however, that generally, it may be useful to treat stair object as a desired object that requires cautioned approach instead of an obstructing obstacle to be avoided).

As will be discussed, when the system identifies an obstructing obstacle, the system may be configured to respond by various options. One option is to continue to report the identity of the identified object (e.g. door object 1600) behind the stair (1610) obstructing object, but also give a haptic or audio warning system that the stair obstructing obstacle might be a problem.

Alternatively, to avoid burdening the user with too much data, an alternative option is to not use haptic output to report the existence of identity of the door object (1600) while it is still potentially obstructed by the stair obstacle (1610). The user can then overcome the stair obstacle first, and then the system will report on the detection of the door object (1600).

As an alternative example, consider a carton (1660) that is placed between the user and the stair object (1610). Here the bounding box of the carton (1660) will clearly overlap with the bounding box of the stair; however, the system may only be able to identify the carton as a generic object. In this case, the system should warn the user about the generic object between the user and the stair. Here, a setting where the system both identifies the carton (1660) as a generic obstructing obstacle, and also outputs the identity of the stair, would appear to be the most useful option.

More specifically, in some embodiments, the system's obstacles finder and objects packer modules can be configured to perform tasks such as using the previously generated depth map to find nearby obstacles, determine if any of these obstacles are also part of the detected objects from the scene, and create 3D locations data for nearby objects/obstacles. Once these are determined, the system may then pack (e.g. format) its findings for output by other system modules such as the system's haptic band, optional audio outputs, alternate Braille haptic transducers, and the like.

This process can also operate by finding generic obstacles, as well as by finding specific objects.

Finding Generic Obstacles

Once the depth map is calculated by the Depth Map Generator, this depth map is sent to an object finder software module. This object finder essentially implements a search algorithm to find a relatively small number (e.g. often less than 5) of nearest objects in the scene that might represent a navigational hazard (e.g. may be positioned directly in front of the user). These nearest objects can be identified based only on depth information.

The output is a collection of 3D locations of nearest obstacles (at this stage, they need not be identified as specific objects yet). These obstacles are not necessarily identifiable specific objects; they may simply be the nearest parts of objects around the wearer that the user may have to consider or avoid while moving around the area.

Special Treatment of Certain Objects

As previously discussed, and as will be discussed in more detail shortly, the main mode of system data output is via a plurality of (e.g. at least two) spatially separated haptic transducers, typically mounted on a haptic band. These transducers can comprise any of eccentric rotating mass transducers, linear resonance array transducers, and piezo transducers. These haptic transducers will often be configured to produce detectable haptic sensations on the user's skin.

The spatial separation between these different haptic transducers will often be 4 centimeters or more. Although these transducers may be located on many parts of the user's body, these haptic transducers are often configured to be worn on a user arm, often between the user's shoulder and the user's wrist.

As will be discussed, in some embodiments, the invention will often be configured to send varying types of haptic output signals (differing "haptic signature waveforms") to these various haptic transducers. For example, in addition to differing intensity levels, the time duration, frequency, phase, and activation pattern of these output waveforms may also be varied so that any given haptic transducer can vibrate in a user distinguishable manner. The more distinguishable the vibration or other haptic output modes, the more information can be transmitted from the haptic band to the user.

Thus, in some embodiments, the invention may further use its at least one computer processor to assign different haptic signature waveforms to different identified tagged objects, as well as to assign a generic haptic waveform to each generic object. This will further help the users use signals from the haptic band to distinguish between different objects. Thus, these different haptic signature waveforms are one type of special treatment of objects.

In case of the system's optional audio output, or alternative haptic transducers, such as handheld Braille haptic transducers, another type special treatment is an audio voice or Braille prompt to the user announcing the name of the identified tagged object. When both the haptic band and an optional audio or handheld Braille output is used, the user can use the haptic band and differing haptic signatures to distinguish locations and movement of at least some identified tagged objects, while also getting the specific names of at least some of these identified tagged objects as well.

For certain important detected objects (e.g. important identified tagged objects) like stairs and door frames previously shown in FIG. 16, a unique haptic signature waveform can be played out by the system's haptic band, while the system's optional audio output (audio processor) or optional handheld Braille haptic output can let the user know exactly which object is in front of the user (e.g. a stair or a door frame). This allows the user to take an appropriate action (e.g. avoiding or approaching such a special identified tagged object) as desired.

In some embodiments, the system may operate to map at least 1 dimension of the identified object's 3D location onto the haptic outputs of the haptic transducers by operations such as: assigning one extreme to a first haptic transducer; assigning an opposite extreme to a different haptic transducer, and varying the intensity of the haptic signature waveforms between these two extremes. Thus, for example, for each identified tagged object, or generic object, the system can perform this mapping by proportionally adjusting the amplitudes of these different haptic signature waveforms between the first haptic transducer and the different haptic transducers. The user can then feel the relative intensity of these various haptic signatures, and estimate roughly where the objects of interest are according to this different intensity.

More specifically, in some embodiments, the system's haptic band and optional audio and Braille outputs can use three classes of haptic effects (three types of haptic signatures waveform) for the perception of depth and spatial location:

1. For generic obstacles, a single type of "obstacles" haptic signature waveform may be output, per object, by the system's haptic band (here varying the amplitude of this one type of haptic signature waveform between multiple haptic transducers is still considered to be one signature waveform). An optional corresponding audio signal may also be output.

2. For "special" identified tagged objects (like stairs and door frames), in a preferred embodiment, a different and ideally unique haptic signature can be used for each special object. Again, this different and ideally unique haptic signature can be sent, varying in amplitude, between different multiple haptic transducers and can still be considered to be a single different and identically unique haptic signature. An optional corresponding audio signal may also be output.

3. For other generic objects that are not acting as obstacles, a single auditory/haptic perception signature may be used that, in a preferred embodiment, is different from all of the other haptic signature waveforms listed above. The reason for not providing a unique perception haptic signature waveform for every single detected object is to make sure that the system doesn't overload the user's sensory perception by providing too many unique effects.

Thus, in some embodiments, the system's obstacle finder and objects packer software/accelerated hardware module may be used to create the 3D location data for each nearby object/obstacle, and if a particular object corresponds to a known ID tagged reference object, tag that object with its reference object class ID thus creating an identified tagged object.

Optional Audio Processing and Output

In some embodiments, the system's optional audio processing capability may be used to use audio to provide pseudo 3D audio perception of depth and spatial location of various objects, as well as voice prompts identifying identified tagged objects.

This pseudo 3D audio perception can modulate signals between audio outputs to the user's two ears, and create stereo sensations of an object's location in much the same way that the system's haptic transducers operate. For example, an audio algorithm such as the following examples discussed below may be used. Note that these same methods may also be used on the system's haptic signature waveforms as well.

The system's at least one computer processor can select an appropriate audio effect waveform for playback for an obstacle or detected object from the non-volatile storage. The processor can further calculate and modulate the intensity level for these audio effect based on the distance and location of the object from the wearer. For example, the audio signal associated with a given object can become more intense as the user approaches an object.

In some embodiments, the system may further modify the pitch of the audio or haptic signature waveform effect in a manner that is inversely proportional to the distance between the object and the user. This can be perceived as a sense of urgency as the user approaches the object. This can provide perception along the Z-axis.

In a preferred embodiment, any of the audio outputs or haptic signature waveforms may vary based on the spatial location (i.e., along the horizontal axis) of the object, and this can be used to determine the ratio of the playback through the left or right headphones, or between a left or right haptic band haptic transducer.

a. For an object on extreme left, the audio or haptic signature waveform can be played entirely by the left headphone or left haptic transducer.

b. For an object on extreme right, the audio or haptic signature waveforms will be played entirely by the right headphone or right haptic transducer c. For an object between these two extremes, the audio volume or haptic signature waveforms will be proportionally adjusted for both left and right headphones and both left and right haptic transducers.

According to either audio or haptic output schemes, the net effect is the perception of the depth and spatial location of the object: user will be able to perceive where the object is located.

In some embodiments, the invention may further use additional haptic transducers to map spatial locations of objects at higher resolution. Here, at least one dimension of an identified object's 3D location can be mapped at higher resolution by assigning intermediate ranges (e.g. middle ranges) of the object's location to these additional haptic transducers. Here the objects may be mapped at higher resolutions by proportionally adjusting amplitudes of the different haptic signature waveforms (e.g. different haptic signature waveforms assigned to the identified tagged object and/or generic objects) between a first haptic transducer, and two or more additional haptic transducers. For example, there can be a left transducer, a right transducer, and a middle transducer, thus allowing for higher resolution spatial location mapping.

Methods described so far provide perception along horizontal (X-axis) and depth (Z-axis) axes. Alternatively, additional haptic transducers may also be used to map 3D locations of objects into extra dimensions (e.g. in addition to the user's left and right as one dimension, distance from user as second dimension, an extra dimension of vertical location can be added). Here, such additional dimensions may be mapped by assigning additional extremes of additional dimensions to additional haptic transducers (e.g. left transducers, top transducers, right transducers, bottom transducers). Here again, the system can proportionally adjust the amplitudes of the different haptic signatures between these transducers (e.g. first haptic transducer (e.g. a left transducer)), the different haptic transducer (e.g. a right transducer), and the additional haptic transducers (e.g. top transducer, bottom transducer) according to this mapping.

In some embodiments, the invention may be still further configured to change the phases of the different haptic signature waveforms. This can help the user to more easily distinguish between various identified tagged objects in complicated situations, such as when a plurality of different haptic signature waveforms is being simultaneously sent by the haptic band.

In this embodiment, for each new object/obstacle after the first one, the system can change the phase of the waveform by an empirically selected amount, and multiplex (add) this waveform to the previous waveforms for simultaneous, phase shifted playback.

The above steps may be repeated multiple times to handle a plurality of obstacles and objects.

Optional Audio Voice Prompt for Identified Tagged Objects

In some embodiments, as previously discussed, the invention may also be configured to provide an audio prompt feature to announce the name of the various identified tagged objects (e.g. detected objects) via the system's bone conduction headphones or other audio output. This can be done configuring the system's computer processor to select (and play back) a pre-recorded audio sample that matches the identified tagged object. The during these audio prompts, if the system is also outputting audio signals pertaining to object locations, this location information may be either multiplexed with the object location audio signals, or the object location audio signals may be briefly muted.

Miscellaneous Firmware Tasks

In addition to the major functions listed in the section before this, in some embodiments the hub firmware can also performs various other miscellaneous tasks to keep the device functioning properly.

Wireless Connection Threads

As mentioned previously, in some embodiments, a wireless transceiver, such as a Bluetooth transceiver, may be used to send data between the various parts (e.g. vision band, hub, haptic band) of the DVIA system. Depending on the image framerate, a background program thread may be established that runs as part of the firmware can be used to establish a wireless connection to any of these various parts. This can also be used to modify the behavior of the haptic band or other system parts. Similarly, other wireless program threads, such as other Bluetooth programs, can be used to optional audio or handheld Braille haptic outputs, such as the previously discussed bone conduction headphones.

Power Optimization

For a wearable device, power consumption is an important aspect. Apart from a low power design of the device hardware, the software also is designed to save power whenever possible.

One such power saving feature is to enter standby mode when no activity is detected for a predetermined amount of time (No Activity Threshold or TNAT), and the vision input also doesn't indicate motion during this TNAT period, the device enters standby mode to save power. In the standby mode, the vision band may be turned off, and the hub hardware itself can be put into a low power mode. This task can be performed by the various power optimizer devices and software.

For example, in some embodiments, the system may be equipped with an optional accelerometer. This can be used to help control device power utilization. For example, when no movement is detected, the accelerometer and the power optimizer software can power the device down to a standby mode. When the accelerometer output indicates movement again, the power optimizer software can instruct the device to exit the standby mode, and to enter an active mode where the device resumes full functionality. Here, the system TNAT value can be chosen to ensure that that the device will not enter standby mode too frequently.

Figure 17:
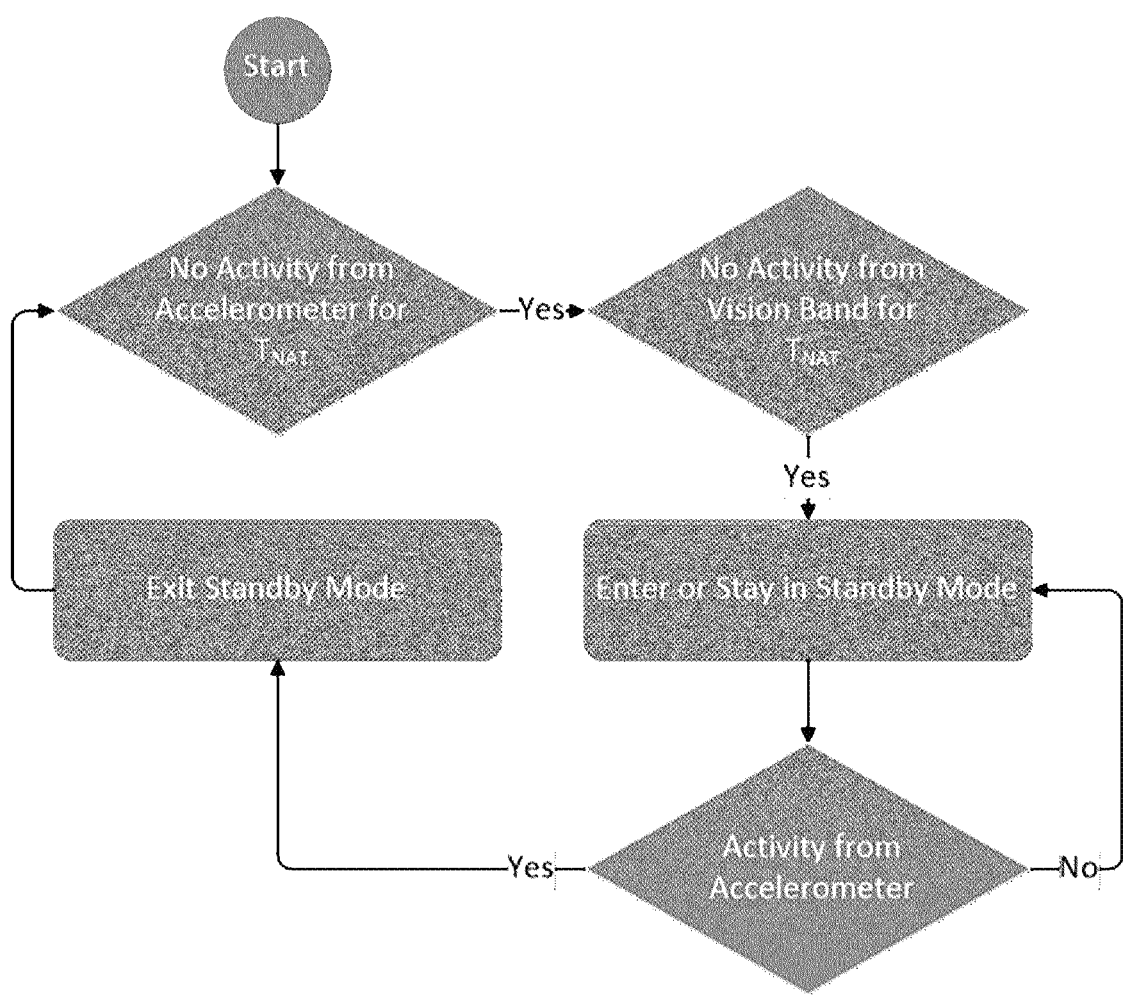
FIG. 17 shows an example of an optional power saver algorithm that may be used in some embodiments of the invention in order to extend battery life.

FIG. 17 shows an example of a power saver algorithm that may be used in some embodiments of the device, here shown being used to switch between standby and active mode.

In some embodiments, if the video sensor input data indicates sufficient change between frames, then accelerometer output can be ignored and device can continue to operate in active mode. This later feature is useful, because the accelerometer output may not always show motion when the device is being used (e.g., when the user is sitting and scanning the scene). In this type of situation, entering standby mode is not desired. Thus a scheme in which the system gives priority to vision input helps guarantee that the device will enter standby only when there is truly no activity.

When the device is in standby, the vision band and other non-needed devices can be turned off to save power. Therefore, in some embodiments, when switching from standby to active mode, only accelerometer output need be considered.

Haptic Band

The Haptic band is a physical component of the device comprising a plurality of haptic transducers. It can be designed in the form of a band that is worn on the user's body, such as on the user's arm between the wrist and shoulder, the user's leg, or the user's torso.

Figure 18:
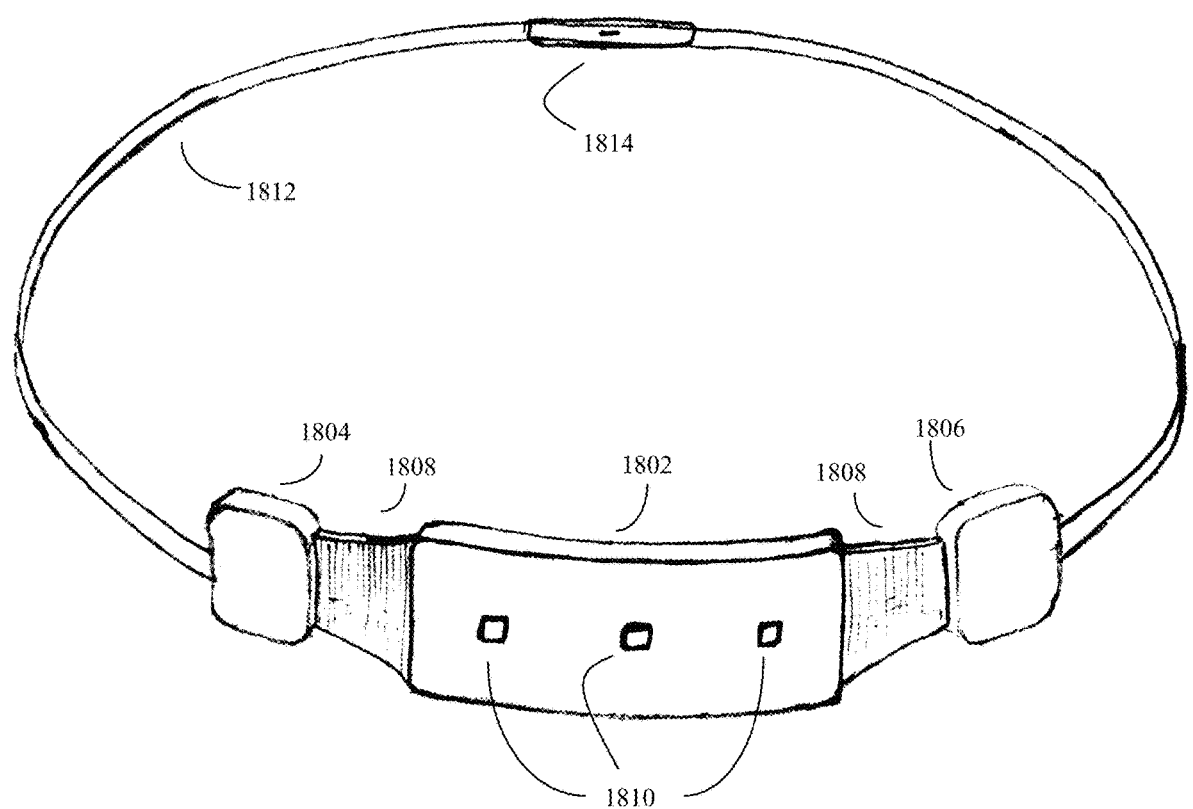
FIG. 18 shows an example of the physical design of a haptic transducer band, such as a band configured to be worn around an arm, leg, or torso of a user.

FIG. 18 shows an example of the physical design of a haptic band, such as an armband configured to be worn around the arm, leg, or torso of a user. Some of the components of this band are shown in table 2 below.

TABLE 2 haptic band components

| ID | Name | Description |
| --- | --- | --- |
| 1802 | Central unit | Contains the unit's main processing board as well as an optional battery and wireless transceiver. Receives inputs from the Hub. Optionally contains additional haptic transducers |
| 1804, 1806 | Haptic Transducers | In some embodiments, these can be sealed in a gel like substance to isolate the transducer from outside vibrations |
| 1808 | Optional flexible connector enclosures | These can be used to conceal electrical wires from the central unit used to drive transducers. |
| 1810 | Optional UI buttons | Optional user interface buttons |
| 1812 | Elastic band segments | Elastic segments of the haptic band |
| 1815 | Clamping mechanism | Mechanism to secure the elastic bands together in an adjustable manner so that the circumference of the Haptic band changes to accommodate the user's body |

In a preferred embodiment, the haptic band may be worn on the forearm of the user, and be operated in a wireless mode, thus allowing the user to move the arm freely without being encumbered by wires.

The central unit (1802) is the main processing unit of the haptic band. It contains a processing board with a low-power processor, haptic driver chips, a battery, and often a wired (e.g. Bluetooth) or wireless interface to receive commands from the hub unit.

Figure 19:
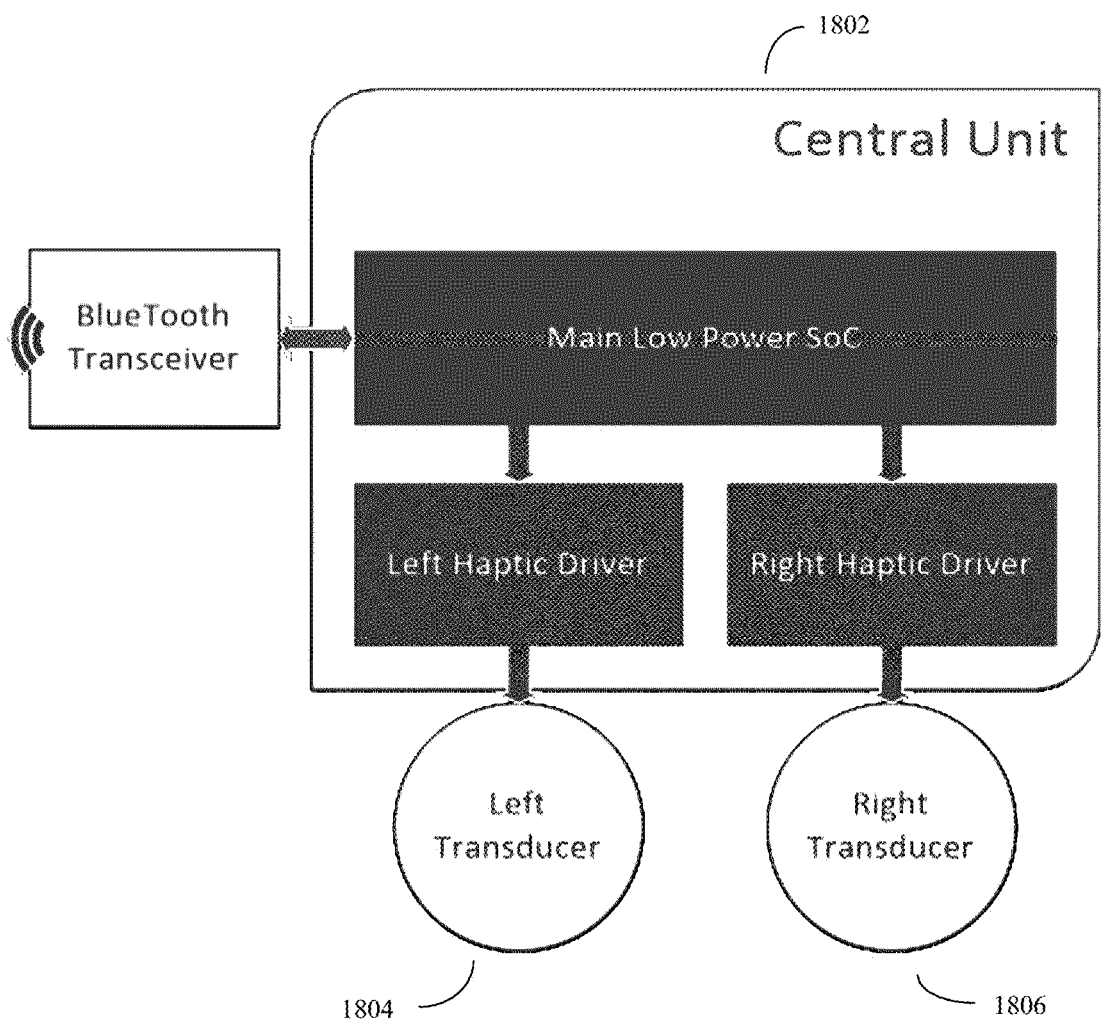
FIG. 19 shows an example of some of the circuitry, such as a haptic band central unit processor, that in some embodiments of the invention may be used to control the haptic band of FIG. 18.

FIG. 19 shows an example of some of the circuitry, such as a haptic band central unit processor, that may be used to control the haptic band of FIG. 18.

A low-power processor can be used to haptic band's software (firmware). This firmware can perform various tasks, including:

1. Continuously (e.g. often at about 15 times per second) receive 3D location data and optional haptic signature waveforms for the various objects.

2. Process this data, optionally with the aid of one or more haptic driver chips, to produce the final output that drives the various haptic transducers.

3. Process other associated data, such as input from optional user interface elements, to perform various actions such as changing transducer intensity levels, and controlling other system functions.

In some embodiments, the haptic driver chips in the central unit can be used to synthesize various haptic signature waveforms and other haptic effects. Here a fine-tuned haptic effects library can be stored as part of the firmware data on the central unit's non-volatile storage media. The haptic driver chip can then be configured to select an effect (e.g., specific haptic signature waveform), and play it at a certain intensity and speed. When an effect is played fast, effectively, its pitch increases; conversely, when an effect is played slower than normal, effectively, its pitch lowers.

In other embodiments, the system processor (e.g. the main, low power, SoC shown in FIG. 19) can be used to drive the various haptic transducers directly.

Haptic Transducers

The haptic band will generally comprise at least two haptic transducers. This may be supplemented by additional transducers, such as a third haptic transducer (this can be placed under the central unit), and other haptic transducers as desired. In some embodiments, these haptic transducers may be configured to touch the wearer's skin, such that the wearer can feel the haptic effects through the skin directly.

Examples of such haptic transducers include:

1. ERM (Eccentric Rotating Mass) haptic transducers: These are designed to generate vibrations of varying intensity and frequency. The vibrations are created due to the eccentric or unbalanced rotating mass. ERMs are the slowest among the three types described here. Individual effects typically require 50 to 100 milliseconds.

2. LRA (Linear Resonance Array) haptic transducers: These haptic transducers rely on resonance effect and operate optimally at a specific resonance frequency. Thus, they generate vibrations of varying intensity, but the change in frequency is very limited. LRAs are much faster compared to ERMs, and can generate effects in the time periods of low 10s of milliseconds.

3. Piezo haptic transducers: These are the fastest haptic transducers and can generate very subtle effects using both intensity and frequency. The effects can be as fast as a few milliseconds. However, these tend to be more expensive at present.

One drawback of ERMs transducers is that they operate slowly, and may not always produce an adequate refresh rate. As a low-cost design choice, LRAs offer a good tradeoff between cost and speed, and are well suited for the haptic band applications. Piezo based haptic transducers, although tending to cost more, also react very quickly and thus are a good choice for this type of application. Other types of transducers can also be used.

FIG. 20 shows an example of an individual haptic transducer, here configured in a vibration isolation enclosure, such as an enclosure with a shock absorbing gel.

In some embodiments, it may be useful to mechanically isolate the vibration of each haptic transducer from the other haptic transducers and the rest of the haptic band. In one embodiment, this mechanical isolation may be done by suspending the haptic transducers in a gel-like substance to help isolate their vibrations, and to prevent their individual vibrations from reaching the rest of the components of the haptic band. Some sort of vibration isolation can often be important, since in the absence of such vibration isolation, the effects produced by one transducer can easily spread to rest of the band. This can then reduce the ability of the wearer to distinguish between the different haptic transducers, and between the various objects being monitored.

The transducers are often directly driven by wires from the central unit. These wires can be concealed inside the haptic band's flexible electric connector enclosure.

Distance Between Different Haptic Transducers

One key aspect of haptic transducer placement is the distance between them. Humans have a limited sense of tactile perception on different parts of the body. For instance, the finger tips can perceive two tactile transducers placed only a couple of millimeters apart. However, the wrist or forearm doesn't have such high level of perception: on the wrist or the forearm, the transducers must be placed about 4 cm or more apart for them to be detected individually as source of the vibrations. This ability to detect the source of the effects as coming from specific transducer is critical to provide the perception of the spatial location of objects.

As a result, in a preferred embodiment of the invention, the various haptic transducers are designed to be separated from each other by at least 4 centimeters. These considerations also suggest that haptic bands configured to fit around the larger circumference parts of the body, such as the middle or upper arm, leg, or torso, may be advantageous.

Note that such considerations do not apply to an optional handheld Braille transducer peripheral, which in some embodiments may be used in place of, or in addition to, audio outputs to provide additional information such as object identification information.

In some embodiments, the elastic band segments (1812) of the haptic band can be configured to provide a small degree of flex. This elasticity, combined with an optional adjustable clamping mechanism (1814), can thus accommodate a wide range of user sizes, such as a wide range of user arm sizes.

Sensory Perception with Haptic Transducers

The perception of depth along the Z-axis, and perception of spatial location along the horizontal X-axis, together provides the pseudo 3D perception of the multiple objects to the wearer. Here, the methods of C. Hatzfeld and T. A. Kern, *Engineering Haptic Devices: A Beginner's Guide*, Springer, 2014; M. Mihalj and J. Podobnik, *Haptics for Virtual Reality and Teleoperation*, Springer, 2012; and M. A. Otaduy and M. C. Lin, *Haptic Rendering: Foundations, Algorithms, and Applications*, CRC Press, 2008 may be useful.

Depth Perception:

In some embodiments, a sensation of depth can be provided by modulating each object's haptic waveform intensity (and other parameters like pitch) in proportion to its depth (distance) from the wearer. For instance, a haptic signature waveform effect that gets gradually intense and/or higher in pitch can be used to represent an object getting near the wearer. Conversely an effect of gradually getting lower in intensity and/or lower in pitch can be used to represent an object getting farther away from the wearer.

Perception of Spatial Location

In some embodiments, the device can use two or more haptic transducers (in this example with two transducers, these are named L and R for left and right) to provide a perception of where various objects are located on the horizontal X-axis. Optionally, additional haptic transducers, such as a third transducer placed in the center of the haptic band, can be used to increase the spatial location fidelity of the perception.

Algorithm 1 (Using Two Haptic Transducers)

This algorithm to generate haptic effects can be very similar to the previously discussed audio algorithms.

1. Select an appropriate haptic effect waveform (haptic signature waveform) for playback from the effects library for an obstacle or detected object, with additional special treatment effects as previously discussed.
2. Calculate an intensity level for the haptic effect based on distance from the wearer. This can be used for depth perception. This provides the raw sensation of the effect getting more intense (e.g., stronger vibrations) as the object gets nearer (and vice versa).
3. Modify the repetition speed of the effect playback to be inversely proportional to the distance. This can be perceived as a sense of urgency as the object gets nearer to the wearer (and vice versa). This method can be used to provide an additional cue for depth perception.
4. Based on the spatial location (i.e., along the horizontal axis) of the object, determine the ratio of the playback through the left or right transducers.
    a. For an object on extreme left, the haptic effect will be played entirely by the left transducer
    b. For an object on extreme right, the haptic effect will be played entirely by the right transducer
    c. For an object between these two extremes, the haptic effect intensity will be proportionally adjusted for both left and right transducers
    d. The net effect is the perception of the depth and spatial location of the object: user will be able to perceive where the object is located
5. For each new object/obstacle after the first one, change the phase of the waveform by an empirically selected amount and multiplex (add) the waveform to the previous waveform for simultaneous, phase shifted playback.
6. Repeat above steps for all obstacles/objects. This will provide the pseudo 3D perception of multiple objects to the wearer via haptic feedback.

Algorithm 2 (Using Three Haptic Transducers)

The algorithm to produce haptic effects with three transducers is identical to the Algorithm 1 above except for the fact that three transducers are driven, and that for spatial location perception, the effects are spread over three transducers instead of two. For the sake of completeness, following is the complete algorithm for three transducers without the extra comments:

1. Select an appropriate haptic effect waveform (haptic signature waveform) for playback from the effects library for an obstacle or detected object.
2. Calculate the intensity level for the haptic effect based on distance from the wearer.
3. Modify the repetition speed of the effect playback inversely proportional to the distance.
4. Based on the spatial location (i.e., along the horizontal axis) of the object, determine the ratio of the playback through the left, center or right transducers.
    a. For an object on extreme left, the haptic effect will be played entirely by the left transducer
    b. For an object that is directly in the front, the haptic effect will be played entirely by the center transducer
    c. For an object on extreme right, the haptic effect will be played entirely by the right transducer
    d. For an object between these two extremes, the haptic effect intensity will be proportionally adjusted for the three transducers. For example, if the object is located between the left and center, only left and center transducers will proportionally play the effect. Similarly, if the object is located between center and right, only center and right transducers will play the effect proportionally
    e. The net effect is the perception of the depth and spatial location of the object: user will be able to perceive where the object is located. The center transducer adds to fidelity of the haptic perception.
5. For each new object/obstacle after the first one, change the phase of the waveform by an empirically selected amount and multiplex (add) the waveform to the previous waveform for simultaneous, phase shifted playback.
6. Repeat above steps for all obstacles/objects. This will provide the pseudo 3D perception of multiple objects to the wearer via haptic feedback.

Use with Refreshable Tactile Graphic Displays

Tactile graphics displays (referred to as TGD from here on) are a type of haptic display that is capable of rendering graphics by physically changing the surface of the display so that users can perceive the graphics via touch.

TGD are available in various resolutions and aspect ratios such as resolutions of 100×100 tactile pixels (or texels) in a square aspect ratio. Thus a square aspect ratio 100×100 tactile pixel TGD device will have 10,000 tactile pixels, but other aspect ratios, such as rectangular aspect ratios (e.g. 40×60, 50×200, etc.) may also be used.

Typically the following methods are most useful for TGD devices of approximately 2,000 tactile pixels (e.g. a rectangular TGD of 40×60 tactile pixel resolution, or 2,400 tactile pixels) resolution, or greater.

Refreshable TGD devices can refresh the display and this allows continuously changing the information on the display as required. There are several underlying technologies used in TGD for rendering the tactile graphics. Examples of some of these technologies enabling the TGD include pin-arrays (where pins arranged in an array are raised or lowered to represent a pixel of image data), pneumatic displays using microfluidics (where the liquid pressure is manipulated to raise the surface selectively), static electricity and surface wave acoustics. This is not an exhaustive list, of course.

These displays can render an array of pixels that are tactile (here termed "texels"), and the resolution can vary from display to display. Unlike video displays, however, these displays have relatively lower resolution due to electromechanical complexity. This makes each texel on the TGD highly valuable in terms of offering information. Several computer vision techniques can be used to make better use of the limited number of texels on such tactile displays.

TGDs are well suited for applications like our device that assists people with vision impairment, and we consider these displays as alternative output devices in addition to previously discussed vibrotactile haptic transducers. Essentially, this device can output an array of pixels to any TGD device that can render and refresh tactile graphics. Following is the description of how the input images are processed to produce output for the tactile graphics displays.

Figure 21:
FIG. 21 shows a two-dimensional (2D) image of a current scene as captured by one of the device's image sensors.
Figure 22:
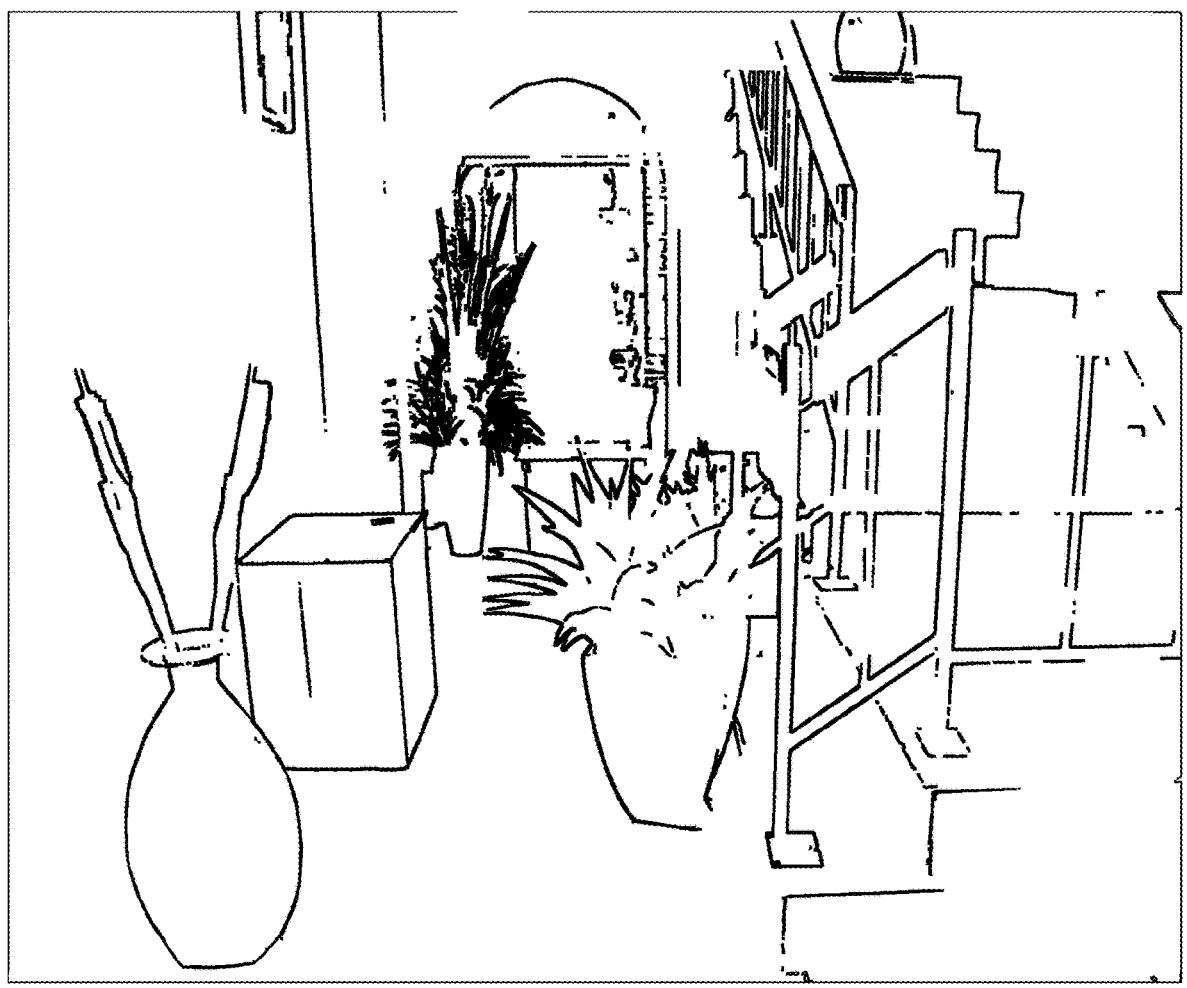
FIG. 22 shows a representation for TGD based only on edge detection in the 2D image of the current scene previously shown in FIG. 21. One can see a lot of clutter in the background behind the foreground objects.

Algorithm to Generate TGD Output from 2D Image and 3D Depth Map:

Even though it is relatively simple to convert a 2D image into an array of pixels that can be rendered by TGD devices—for example, for a TGD that has the resolution of 100×100 tactile pixels (or texels), the input can be simply scaled to 100×100 pixel resolution with binary values (1 representing raised texels; 0 representing inactive texels)—the result will contain unnecessary and confusing information on the display that doesn't clearly convey the important aspects of the image. For example, for an input 2D image as shown in FIG. 21, a basic edge detection will result in a cluttered image as shown in FIG. 22.

Therefore, it is important to remove unnecessary information from the original image.

A sophisticated method is required to assess what is important in a 2D scene captured: one such method is to identify and isolate various shapes and objects in the scene based on edges and/or planes in the 2D image and combine that with 3D information available in the depth maps that are generated by the device. This can be accomplished as follows:

(1) processing the current input image to find edges and planes, and (2) using depth information from the depth map to remove unnecessary information, and highlight important information. For example, one can create a mask representing locations where the objects are deeper than certain maximum limit for a scene. This mask can then be used to remove all objects (and background) that are farther than certain distance. Similarly, depth map can also be used to create 3D shape of objects of interest and isolate them from background.

There are several edge detection algorithms like Sobel filter, Canny edge detector, second order directional derivative, phase stretch transform, etc., that can be used individually or in combination to detect edges in the scene. Additionally, algorithms like flood fill (or seed fill) can be optionally used to convert edge shapes into solid shapes selectively. For example, one selection criteria may be that two adjacent shapes won't be filled in as a solid shape, or only shapes that don't share edges will be filled in. The idea being that solid shapes can be easier to identify by tactile sense as opposed to only rendering edges, especially if the shapes are separated from each other. As another, optional, pre-processing step, a sophisticated image segmentation algorithm based on either classic computer vision or a convolutional neural network can be used to identify recognized segments or shapes around objects and planes; this algorithm would segment the image into various identified objects with clear boundaries around them (this algorithm can be especially useful for identifying large planes like walls and floor in addition to smaller objects).

Figure 23:
FIG. 23 shows a depth map of a current scene previously shown in FIGS. 21 and 22 as generated by the device.

See FIG. 23 as an example of a depth map that is generated by the device for the current scene.

Figure 24:
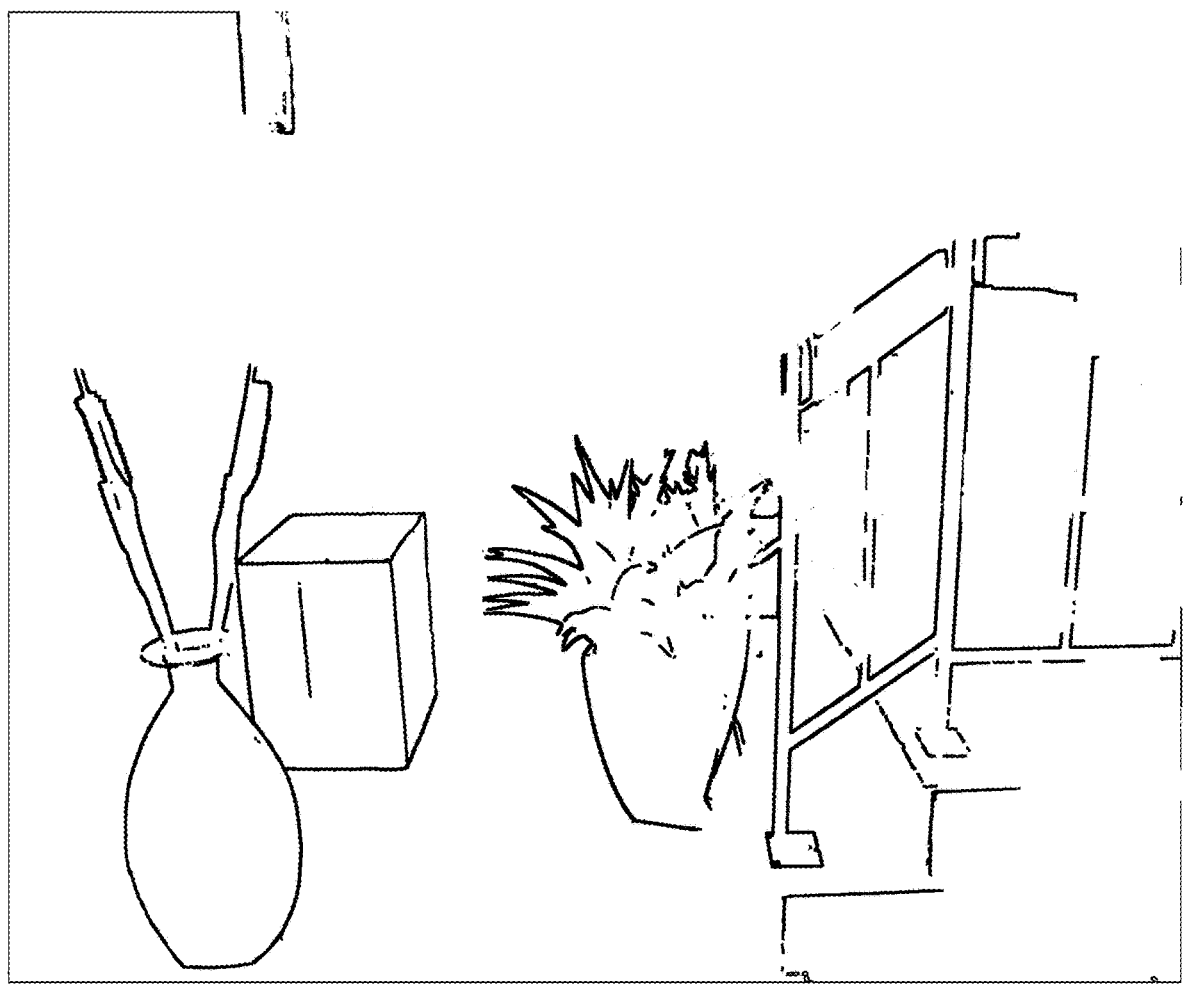
FIG. 24 shows a point-of-view image prepared for the TGD using the information from the depth map. This scheme reduces background clutter and only the objects closer to the user are rendered (shown).

The result of these two steps is a virtual scene that contains only the shapes and objects that we want to present to the user while the other parts of the image are suppressed. This new virtual scene can now be further processed to create at least the following views for the user:

1. Presenting the "point-of-view" (PoV): This will have the same viewing angle of the user/camera. The image will only contain shapes and edges converted to texels. All unnecessary information, especially the background will be removed. If an object moves left, right, up or down in real scene, this movement will be rendered by the same movements of the representation of the object on the TGD. FIG. 24 shows an example of such a PoV image.

Figure 25:
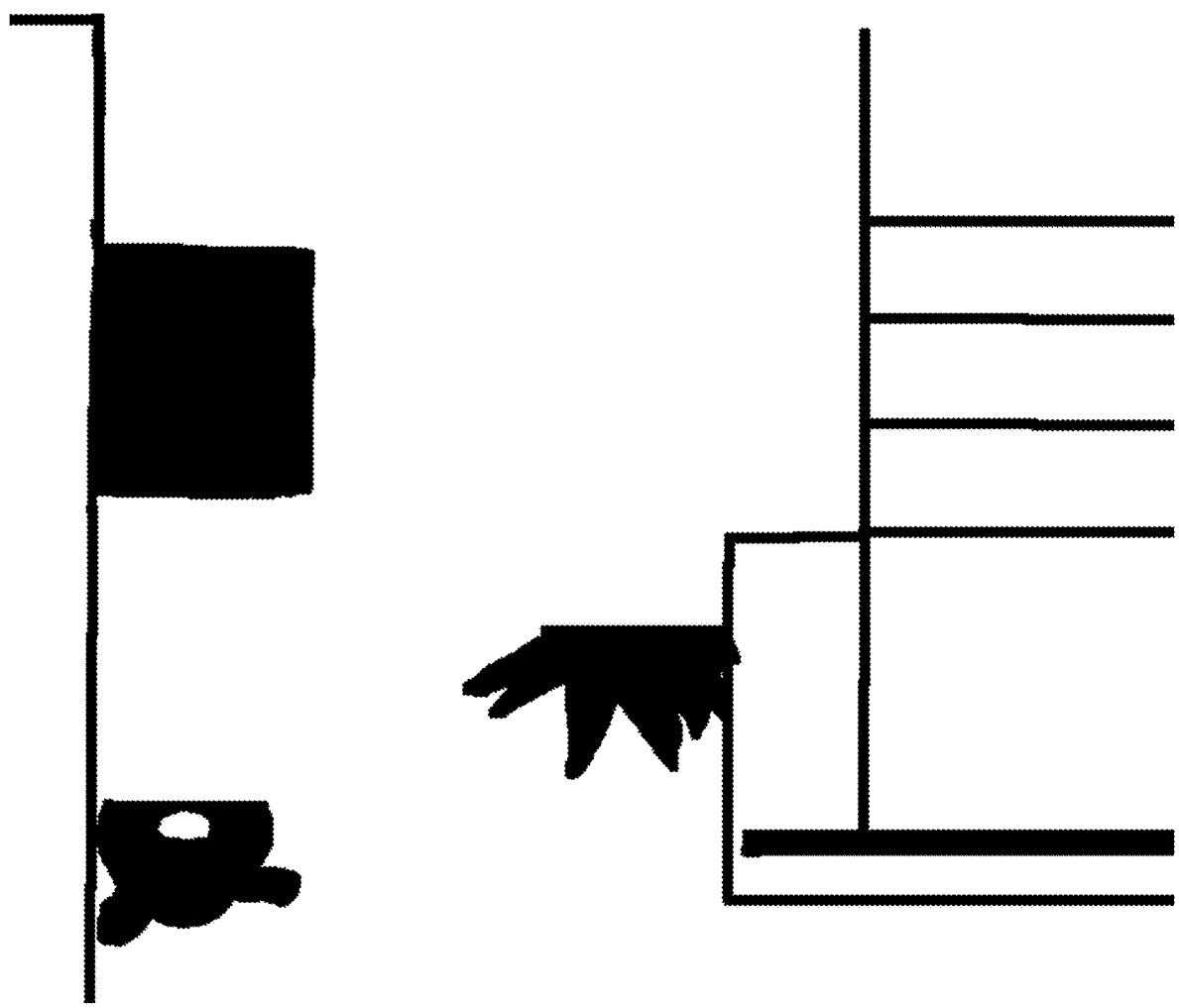
FIG. 25 shows a bird's-eye view (top plan view, overhead view) of the scene previously shown in FIGS. 21 to 24. This bird's-eye-view is prepared for the TGD using the depth information and POV information. All the unnecessary information is removed using the depth information, and the objects are presented as if captured by a virtual camera hovering over the scene. Objects closer to the user are towards the bottom, and objects further from the user are towards the top of the image. The shaded areas on this image are created using continuity information in the depth map, combined with edge detection.

2. Presenting a virtual "bird's-eye-view" or "top plan view": This view will present the objects in the scene as if a [virtual] camera is hovering over the scene. This is calculated based on combination of 2D image and 3D information from the depth map. This allows approximation of how various objects would look from top. In this view, the distance from the bottom edge can represent distance from the user. For example, objects closer to the user can be presented closer to the bottom edge of the display, while farther objects can be presented farther from the bottom edge of the display. If an object moves away, closer, left or right with respect to the user, these movements will be rendered on the TGD by the movement of the representation of the object in up, down, left or right direction respectively on the TGD. Vertical movement of the objects will not be rendered in this view. Objects that are not directly in view of the user/camera will be absent in this view as well. FIG. 25 shows an example of such a bird's-eye-view (top plan view, overhead view) image generated by the device.

3. Presenting a symbolic view: Utilizing the object detection techniques, various objects can be recognized and represented by their symbols or simplified shapes instead of actual shape as calculated based on the image. The idea behind creating this view is to present the user with simplified and consistent information over time. For example, a chair, in addition to its line image, can also be rendered by its symbol every time it is found in the scene.

The invention's symbol view approach allows users to quickly grasp what each object is. This can be much quicker than merely trying to determine this based on, for example, the various shapes that a chair can take from different angles. Of course, one disadvantage of this symbol view approach is that it would require the user to learn the TGD texel symbols for different shapes; however, considering the difficulty of identifying objects from the limited resolution on tactile displays, this can be a good option for visually impaired people who are willing to learn the new symbols.

The view selection can be made by the user as part of user preferences stored on the device. For each of the above views, a certain area of the TGD can be reserved for textual information. For example, a scrolling Braille text can be presented at the bottom of the screen to describe the scene and objects within.

Yet another alternative is to combine a touch sensor with the TGD that also identify where on the TGD the user is touching. This touch data input from user can be used to display the description of that location via text or audio (this is analogous to a tap on a touchscreen of a mobile phone).

Figure 26:
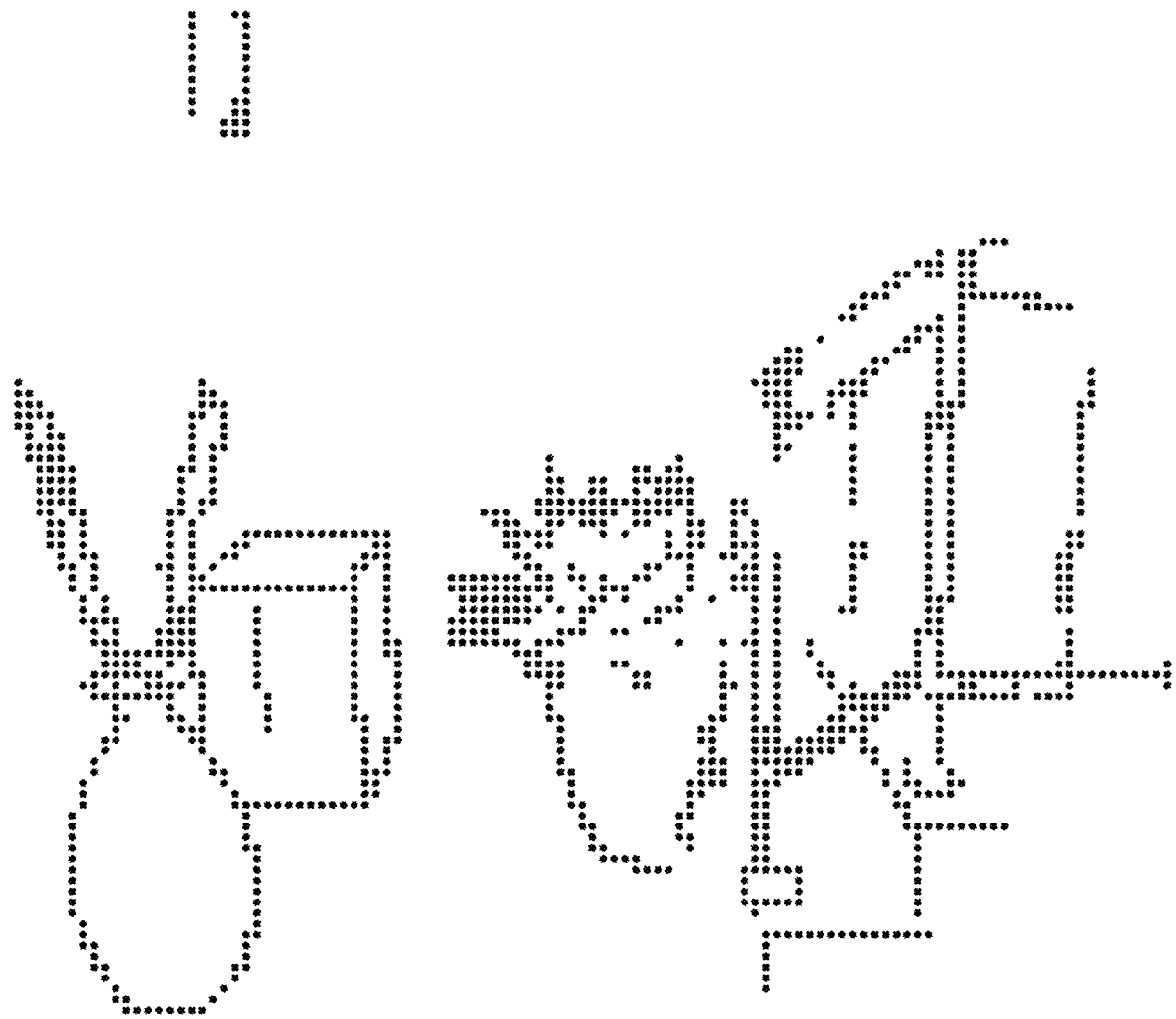
FIG. 26 shows a pin-array based tactile graphics display rendering the point-of-view for the previously shown example scene.
Figure 27:
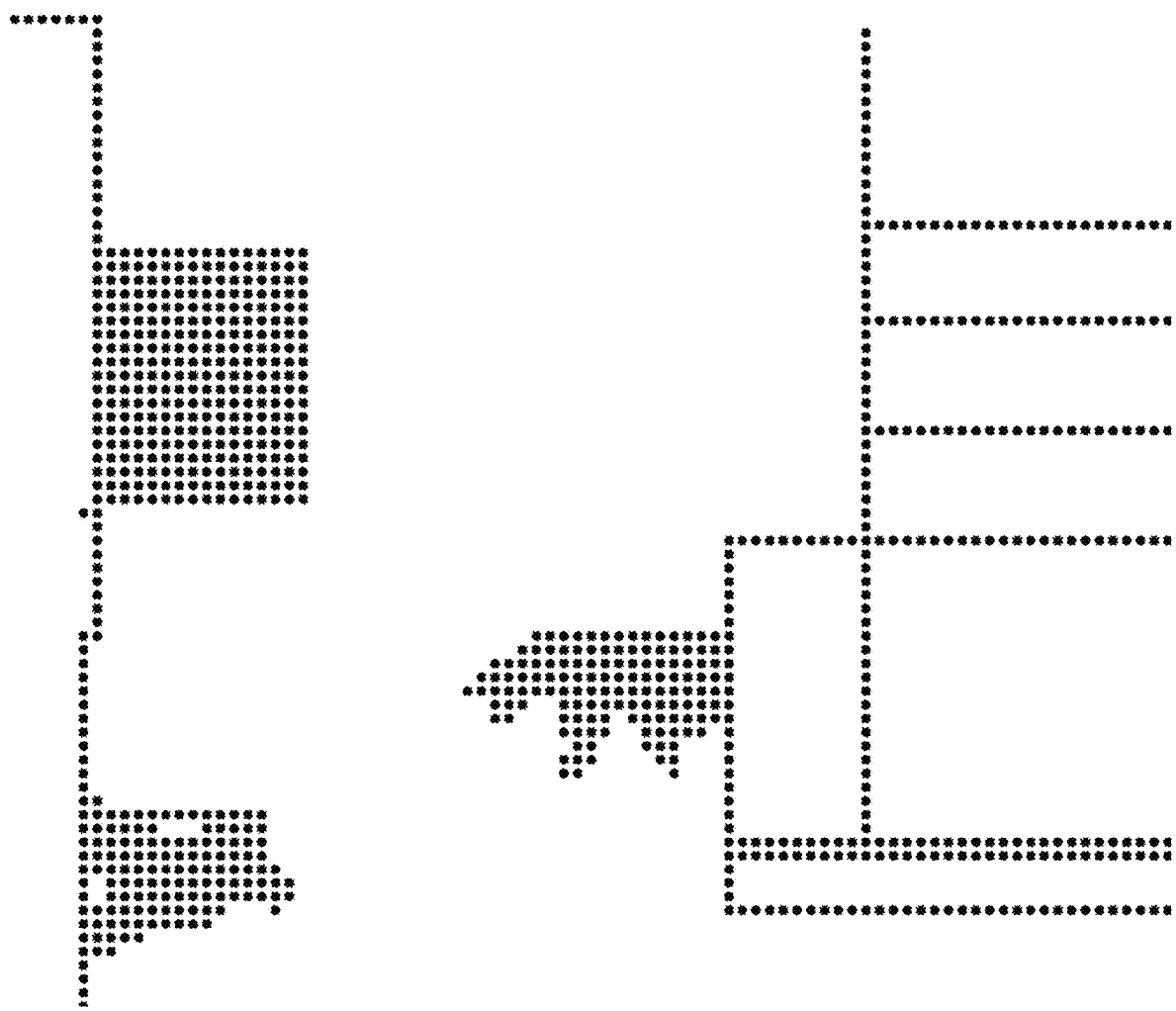
FIG. 27 shows a pin-array based tactile graphics display rendering the bird's-eye-view (top plan view, overhead view) for the previously shown example scene.

FIGS. 26 and 27 show views on a target TGD device in the form of a pin-array for the PoV and Bird's-eye-view (top plan view, overhead view) respectively.

According to the invention, the TGD device may be worn by the user, for example as part of an armband, glove, belt, necklace, or other device that may be affixed to the user or the user's body or clothing. Alternatively the TGD device may be carried by the user, for example as a handheld TGD device, which may not actually be physically affixed to the user except by grasping action of the user's hand.

Although, in some embodiments, the TGD device may be used in conjunction with the other haptic transducers and methods disclosed herein, in other embodiments the TGD device may operate as the only haptic display employed by the device. That is, in this embodiment, the other haptic transducers need not be used, and only the TGD device, operating as the alternative haptic display, need be used.

The invention claimed is:

1. A method of visual assistance for a human user in an environment, said method comprising:
using a plurality of user worn video sensors to acquire 3D images of said environment, said environment comprising a plurality of different objects, each different object comprising a different 3D object location, and performing at least one of:
a) distance analyzing, using at least one computer processor and computer vision distance algorithms, said 3D images of said environment to identify both far objects and nearby objects with a 3D object location near said user;

b) object analyzing, using said at least one computer processor and computer vision image recognition algorithms, any of said far objects and nearby objects against ID tagged reference objects, and assigning corresponding ID tags and bounding boxes to both of those far objects and nearby objects which correspond to said ID tagged reference objects, thereby producing identified tagged objects;

c) classifying those nearby objects that do not correspond to said ID tagged reference objects as generic objects; and mapping, using said at least one computer processor and a plurality of spatially separated user worn haptic transducers, 3D object locations of at least some of those identified tagged objects and generic objects onto haptic outputs of said haptic transducers by further using said at least one computer processor to assign different haptic signature waveforms to said identified tagged objects, each said identified object having an identified object 3D location, and assigning a generic haptic waveform to each generic object;

mapping at least 1 dimension of said identified object 3D location onto said haptic outputs of said haptic transducers by:

i) assigning one extreme of said at least 1 dimension to a first haptic transducer;

i) assigning an opposite extreme of said at least 1 dimension to a different haptic transducer; and for each identified tagged object, or generic object, performing said mapping by proportionally adjusting amplitudes of said different haptic signature waveforms assigned to said identified tagged object and generic objects between said first haptic transducer and said different haptic transducers according to said mapping.

2. The method of claim 1, wherein said video sensors are spatially separated video sensors configured to be worn on said user's head.

3. The method of claim 1, wherein said computer vision distance algorithms comprise stereo image rectification and depth map computation algorithms;

said image recognition algorithms comprise any of geometric modelling methods, convolutional neural network methods, and single shot multibox detection SSD frameworks; and wherein said ID tagged reference objects comprise objects characteristic of doorframes, stairs, street curbs, and other navigational markers.

4. The method of claim 1, further obstacle analyzing, using at least one computer processor, computer vision distance algorithms, and obstacle analysis algorithms, said 3D images of said environment to identify nearby obstacles with a 3D object location near said user;

wherein said obstacle analysis algorithms are configured to detect near objects that are within a defined distance of a bounding box of said identified tagged objects and which are between a 3D location of said user and said bounding box of any of said identified tagged objects, thus identifying obstructing obstacles; and performing at least one of:

d) generating any of a haptic or audio warning signal for said obstructing obstacles; and e) suppressing haptic output for those identified tagged objects that are blocked by said obstructing obstacles.

5. The method of claim 1, wherein said haptic transducers comprise at least two haptic transducers, comprising any of:

f) eccentric rotating mass transducers;

g) linear resonance array transducers;

h) piezo transducers;

said haptic transducers configured to produce detectable haptic sensations on said user's skin;

and wherein said spatial separation comprises at least 4 centimeters.

6. The method of claim 1, wherein said haptic transducers are configured to be worn on an arm of said user between the user's shoulder and said user's wrist.

7. The method of claim 1, further performing any of mapping additional dimensions and mapping at higher resolution of said 3D locations of at least some of said identified tagged objects and generic objects by:

Mapping additional dimensions by:

k) assigning additional extremes of additional dimensions to additional haptic transducers;

l) proportionally adjusting amplitudes of said different haptic signatures between said first haptic transducer, said different haptic transducer, and said additional haptic transducers according to said mapping; and mapping at higher resolution by:

mapping at least one dimension of said identified object 3D location onto said haptic output of said haptic transducers at higher resolution by:

m) assigning intermediate ranges of said at least 1 dimension to said additional haptic transducers, and;

wherein for any of said mapping additional dimensions and mapping at higher resolution, for each identified tagged object and generic object, performing said mapping by proportionally adjusting amplitudes of said different haptic signature waveforms assigned to said identified tagged object and generic objects between said first haptic transducer, said additional haptic transducers, and said different haptic transducers according to said mapping.

8. The method of claim 1, further changing phases of said different haptic signature waveforms to allow said user to more easily distinguish between said identified tagged objects when a plurality of said different haptic signature waveforms are being simultaneously transmitted.

9. The method of claim 1, further using audio or alternative haptic displays to output information pertaining to any of:

n) identity or distance to any of said ID tagged reference objects;

o) presence or distance to any obstructing obstacles.

10. The method of claim 1, further using alternative haptic displays comprising at least one tactile graphics display with a resolution of at least 2,000 tactile pixels to output tactile graphics display image information pertaining to any of:

n) identity or distance to any of said ID tagged reference objects;

o) presence or distance to any obstructing obstacles.

11. The method of claim 10, further comprising:

edge determination, using at least one computer processor, any of 2D or 3D images of said environment to determine edges of both far objects and near objects;

depth determination, using at least one computer processor, and 3D images of said environment to determine depths of both far objects and near objects;

using said depths of both far objects and near objects to remove edge information from far objects beyond a predetermined distance; and displaying edges or shapes of at least near objects before said predetermined distance as a point-of-view texel image on said tactile graphics display.

12. The method of claim 11, further displaying identities of at least some identified tagged objects as at least one textel on said tactile graphics display, or as an audio signal in response to user touch input on said tactile graphics display.

13. The method of claim 10, further comprising:
edge determination, using at least one computer processor, any of 2D or 3D images of said environment to determine edges of both far objects and near objects;
depth determination, using at least one computer processor, and 3D images of said environment to determine depths of both far objects and near objects;
using said depths of both far objects and near objects to calculate a bird's-eye-view of said environment; and
displaying edges or shapes of both far objects and near objects as a bird's-eye-view texel image on said tactile graphics display.

14. The method of claim 13, further displaying identities of at least some identified tagged objects as at least one texel on said tactile graphics display, or as an audio signal in response to user touch input on said tactile graphics display.

* * * * *